United States Patent [19]
Albers et al.

[11] Patent Number: 5,020,335
[45] Date of Patent: Jun. 4, 1991

[54] METHOD AND APPARATUS FOR SIMULTANEOUS HEAT AND MASS TRANSFER

[75] Inventors: Walter F. Albers, 2626 E. Arizona Biltmore Cir., #23, Phoenix, Ariz. 85016; James R. Beckman, Tempe, Ariz.

[73] Assignee: Walter F. Albers, Phoenix, Ariz.

[21] Appl. No.: 355,766

[22] Filed: May 19, 1989

Related U.S. Application Data

[63] Continuation of Ser. No. 883,734, Jul. 9, 1986, abandoned.

[51] Int. Cl.[5] ........................ F25B 17/02; F25D 3/04
[52] U.S. Cl. ........................................ 62/271; 62/121; 62/94; 62/92; 165/115; 261/153
[58] Field of Search ...................... 62/93, 92, 271, 121, 62/94; 165/111, 115; 261/153

[56] References Cited

U.S. PATENT DOCUMENTS

| | | |
|---|---|---|
| 4,037,653 | 7/1977 | Meissner et al. ..................... 261/22 |
| 4,477,396 | 10/1984 | Wilkinson ........................... 261/153 |
| 4,594,855 | 6/1986 | Gunther ............................. 62/93 |

FOREIGN PATENT DOCUMENTS 868011 10/1981 U.S.S.R. .............................. 261/23.1

Primary Examiner—Albert W. Davis, Jr.
Attorney, Agent, or Firm—William W. Holloway

[57] ABSTRACT

A method and apparatus for heat and mass transfer is described that is applicable to: concentration, crystallization, purification, fractionation, stripping, absorption, and/or heat exchange for liquid media; drying for solid or gel media; and temperature and humidity modification for gas media. Generally, using a moving gas, such as air at a constant and atmospheric pressure, a continual change in a vapor-liquid equilibrium is created between proximate but continually changing gas and liquid temperatures within energy transferring chambers. Chamber wetting, implemented segmentedly, allows mass transfer into and from the moving gas. A forced temperature differential in each chamber causes heat transfer between chambers by means of thermally conductive partitons. This transfer can allow condensation causing further evaporation in the opposite chamber resulting in a recycling of energy. Concurrent with temperature variances, the segmented wetting can further allow wetting substance concentrations caused by evaporation, selective condensation, or absorption to vary between wetted sectors. A migratory movement connecting these wetted sectors generally provides for development of applicable concentration gradients between the wetted sectors along the chamber length.

30 Claims, 6 Drawing Sheets

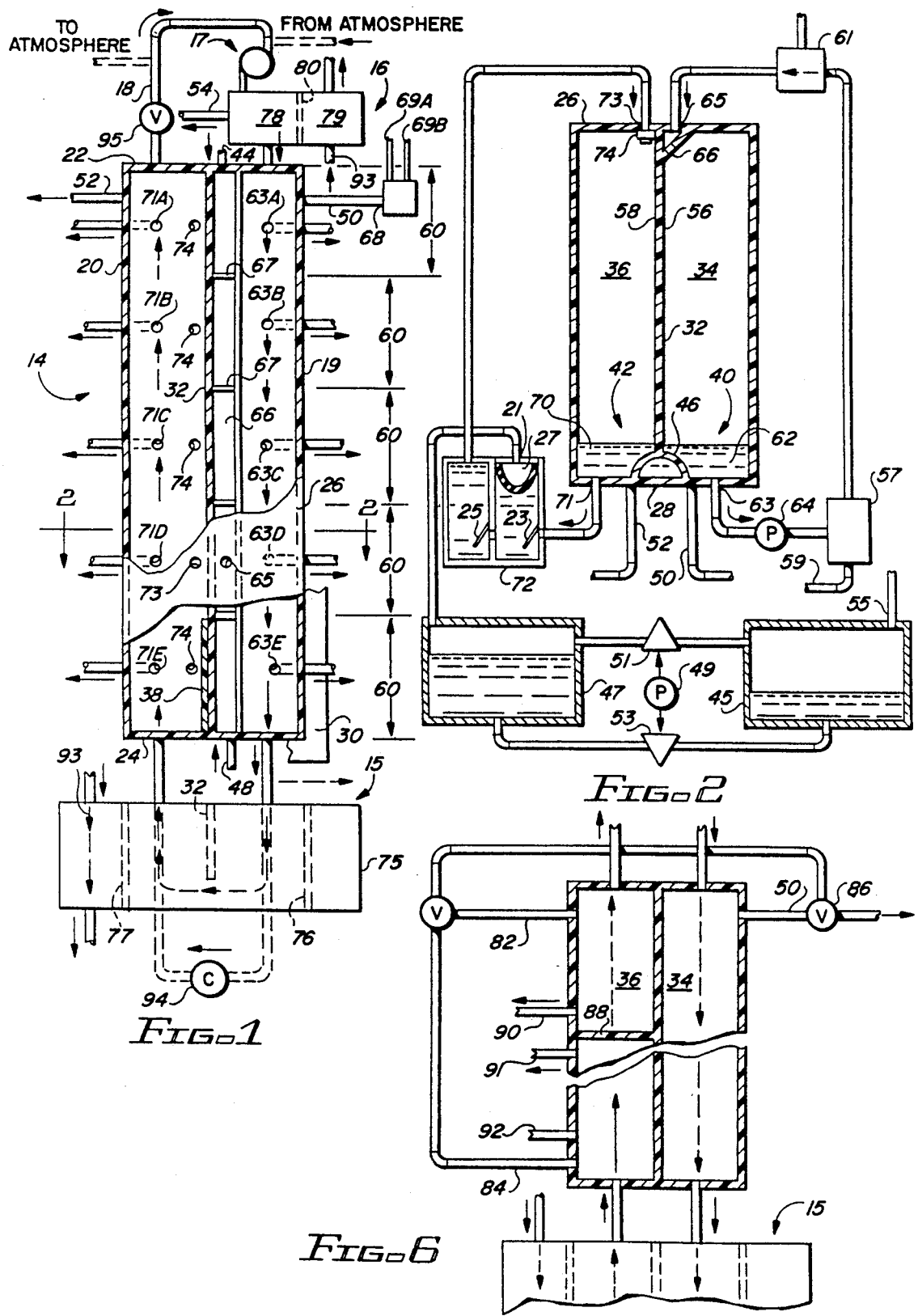

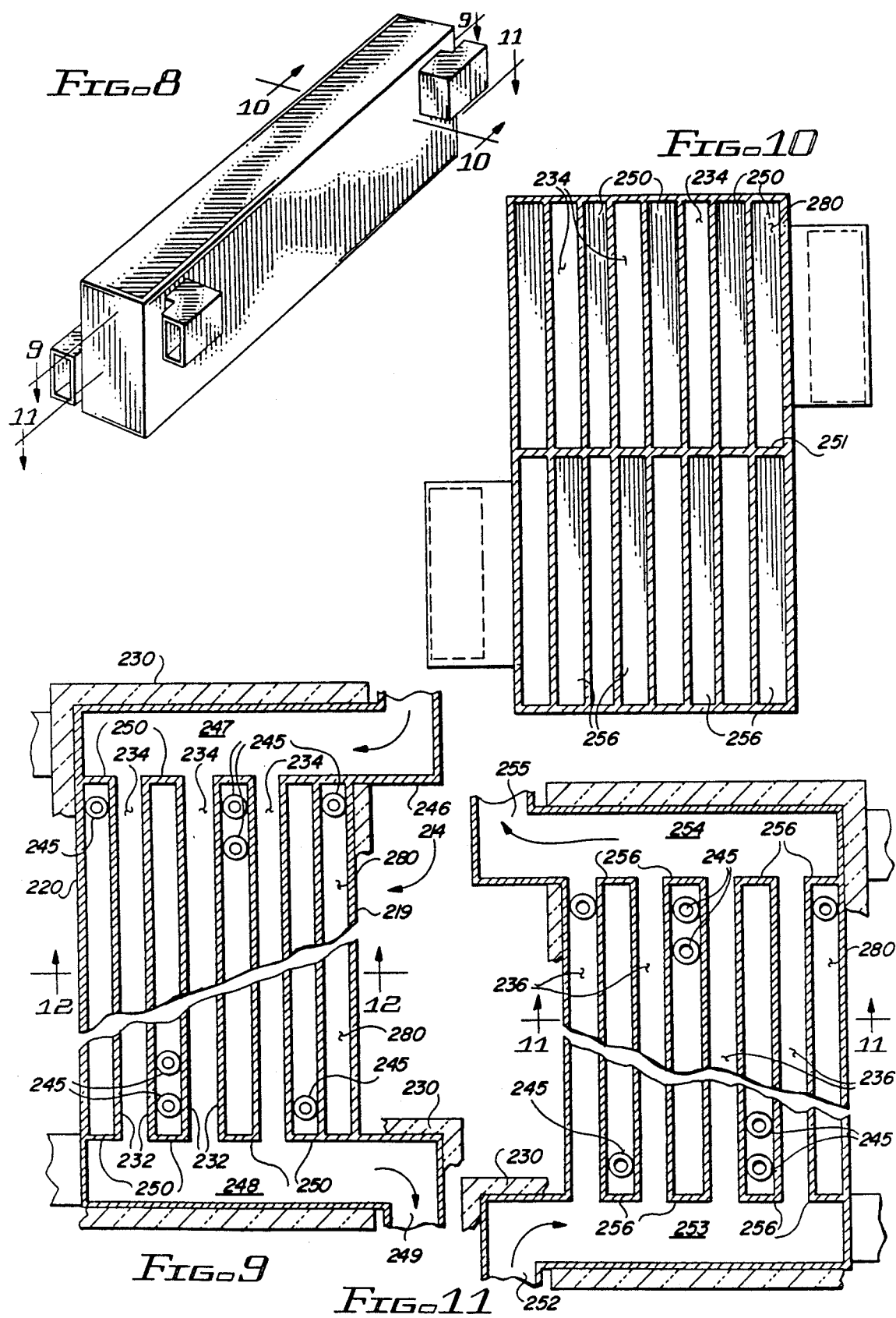

METHOD AND APPARATUS FOR SIMULTANEOUS HEAT AND MASS TRANSFER

This is a continuation of copending application Ser. No. 06/883,734 filed on July 9, 1986, now U.S. Pat. No. 4,832,115 granted May 23, 1989.

BACKGROUND OF THE INVENTION

The present invention relates to a method and apparatus for efficient heat and mass transfer. More particularly, the present invention relates to a method and apparatus incorporating chambers and heat transferring partitions with segmented wetting that operates with a single gas stream at nearly constant pressure. The segmented wetting of part or all of these chambers allows gas and wetting substance temperatures to be proximate and evaporating and condensing liquid temperature and concentration integrities to be maintained. A migration movement of these wetting substances from segment to segment may allow temperature and concentration gradients to be developed or maintained. The method and apparatus can be utilized as a liquid phase concentrator, a crystallizer, a purifier, a fractionator, a stripper, an absorber, a heat exchanger, a solids or gel dryer, a reactor, and as a gas cooler or heater, and can be coupled to other processes.

Earlier developments which included elements such as a moving gas having changing vapor carrying capability, or a wetted heat transferring partition, provide a background for the present invention. Apparatus and methods using a moving gas at substantially constant pressure are known. For example, U.S. Pat. Nos. 3,860,492 to Lowi, et al. and 4,636,703 to ElDifrawi, et al. teach humidification-dehumidifications in independent vessels where energy savings, generally, relate to raising incoming feed liquid temperature. U.S. Pat. No. 3,356,591 to Peterson alters process air pressures first by compressing and heating ambient air for evaporation and then a turbine to expand and cool the air for condensation. In U.S. Pat. No. 3,214,351, Lichtenstein shows that the process can allow for air recirculation in a closed system under vacuum conditions. In other closed systems, Ramsmark discloses in U.S. Pat. No. 4,243,526, an internal combustion engine driving a compressor with the first providing heat and the second a means for condensing while Grees, U.S. Pat. No. 4,310,382 teaches using the opposite sides of a heat pump for temperature differentials. Other closed systems have incorporated methods for causing the recirculating air to be of higher pressure and temperature in the evaporation vessel than in the condensation vessel. In creating these differentials, Rhoades, in U.S. Pat. No. 4,200,497, describes using a high pressure water jet and a low pressure condenser, Mock, in U.S. Pat. No. 4,276,124 describes combining a fan followed by a pressure regulator, while Pampel, U.S. Pat. No. 4,308,111 incorporates a membrane between the two functions. U.S. Pat. Nos. 3,167,488 by Malek and 4,329,205 by Tsumara, et al. teach devices without forced gas movement where transfer of condensation heat for further evaporation is provided through a succession of plates each operating at a lower temperature. An effort to obtain improved mass transfer by negating the effects of a stagnant gas has been made by Petrik, et al. in U.S. Pat. Nos. 4,329,204 and 4,402,793 by closer spacing of the parallel plates. Use of closely spaced plates is also taught by Henderyckx in U.S. Pat. No. 3,563,860 where vapors through a permeable membrane condense on a wall transmitting heat to a liquid increasing its temperature. A counter-current flow of liquid and vapor is described by Cantrell in U.S. Pat. No. 3,788,954 for separating fluids having different vapor pressures. The use of a plurality of coaxially superimposed liquid containing basins in lieu of plates is taught in U.S. Pat. No. 3,930,958 by Maruichi. The combination of a gas and a partition in a device operating at constant pressure is shown in U.S. Pat. No. 2,902,414 by Schmerzler wherein two separate air streams are utilized in separate humidification, heat exchange, and condenser functions. A distillation apparatus having chambers where liquid is evaporated and chambers or devices on which saturated air is condensed is taught in U.S. Pat. No. 3,522,151, by Dinsmore. A nonsegmented wetted heat transfer surface allowing liquid mixing is taught in U.S. Pat. No. 4,350,570 by Makstuanko, et al. in an apparatus wherein a air stream of generally low humidity is divided into primary and secondary flows with one serving to cool a separate condensation element. A nonsegmented wetted heat transfer partition adjacent a generally packed column utilizing a single gas stream wherein gas and liquid streams flow in a concurrent manner mixing temperature profiles is taught in U.S. Pat. No. 3,822,192 by Brown.

It will be apparent that no concerted effort in developing close temperature approaches of the gas streams, preservation of liquid temperatures and concentration profiles, and combining these features in an efficient energy and mass transfer method has been contemplated.

In accordance with the present invention, a transfer method and device are provided wherein all phases, liquid or gas, may operate thermally counter-currently, wherein all liquids and gases in close proximity can be maintained at relative close temperatures, and wherein concentrations are achieved by maintaining process integrity.

It is an advantage of the present invention that it can operate with a plurality of heat sources. These heat sources can include high grade heat such as steam or combustion of natural gas, or low grade heat, such as waste heat, solar energy, and surface heat of water bodies or even ambient air, and the compression of gases to provide the desired temperature increases.

It will be appreciated that costs can be quite low. The amount of heat used is minimized because the present invention can reuse this heat many times. The invention generally operates at ambient pressure, eliminating the high initial costs and maintenance associated with pressure or vacuum vessels. In addition, the heat transfer partitions can be made of inexpensive plastic film or metal foils.

The apparatus and method of the present invention can be combined with other processes. Examples include efficient reduction of salt solutions to higher concentrations such as lithium bromide reconcentration in air conditioning systems. Also, separating ammonia-water streams by stripping and vapor absorption may find application in absorption refrigeration systems. Coupling its separation capabilities in closed cycle arrangement with reverse electrodialysis, pressure retarded osmosis, or vapor pressure differential techniques offers a choice of solutions beyond the salt brine and water mixtures presently investigated to include a number of less volatile with more volatile solution combinations.

It is a further achievement that the present invention requires only minor alteration to perform a plurality of applications. For example, many applications were tested in a single laboratory model. In this model, performance factors of over 8 were achieved for desalination of brackish or sea water. Based on this data, simulations indicate performance factors ranging in excess of 40 are possible. The model also achieved reduction of sea water to almost crystalline condition, and a reduction of a potassium carbonate solution to fifty percent from twenty-five percent concentration. The same laboratory model enriched an ethanol water mixture from a 10% feed to a 41% concentrate using 1,300 Btu's per gallon compared with approximately 6,000 for standard distillation techniques. Simulation of full scale devices indicate a 10% ethanol solution may be enriched to 95% while offering a 30 times energy reduction compared with conventional distillation columns. In air management applications, the same model offered a 27 percent greater reduction in air temperature then did a conventional evaporative cooler. In another test, the model, when supplied with a 50% potassium carbonate solution as a liquid desiccant, reduced a saturated air stream to 56% relative humidity. Simulations indicate achieving dwelling comfort zone maintenance for the weather conditions of Phoenix, Ariz. and Houston, Tex. while achieving projected electrical coefficients of performances ranging from 23 to 43.

SUMMARY OF THE INVENTION

The present invention relates to a method of heat transfer and mass transfer. As used herein, heat transfer is the movement of energy that heats or cools a fluid (liquid or gas) or evaporates a liquid or condenses a vapor that must exchange through a gas/liquid, gas/solid, or liquid/solid interface or combinations thereof. Mass transfer is the movement of an evaporating liquid from the liquid phase into the gas phase or movement of the condensing vapor from the gas phase into the liquid phase.

The present invention employs a gas which is generally defined as a noncondensing vapor or gas and in most cases is ambient air. This gas generally flows through a first chamber and then through a second chamber, the chambers being thermally connected. Thermally connected, in this context, means that fluids (gas or liquid) from each chamber are brought into mutual close proximity on opposite sides of a heat transferring partition so that heat can transfer from one chamber to the other chamber. In its passage, the gas generally operates under nearly constant pressure with pressure change caused by frictional losses. A temperature change by a separate auxiliary heat exchange is affected to this gas after its passage through the first chamber, but before its flow through the second chamber. This temperature change has two effects. First, it causes a temperature differential to be developed between the gases in the chambers. Second, it causes a temperature range to be created to this gas from one end of the chamber to the other. These changes cause the gases to approach a vapor-liquid equilibrium value and thus receptive to receiving or losing vapors. Equilibrium value is a vapor-liquid equilibrium concentration or temperature. A vapor liquid equilibrium can be said to exist when the escape tendency of the species from liquid to a vapor phase is exactly balanced with the escape tendency of that species from a vapor to a liquid phase at the same temperature and pressure.

Wetting substances are applied to part or to all of one or both chambers. The wetting substance may be a liquid, gel, or solid and is generally inert. In some cases, the wetting substance can be reactive, meaning that its molecules may be chemically combined with each other or with the gas. This wetting application is segmented, which means: (1) that the chamber is segmented along its length into sequential sectors that may be equal or unequal in width; (2) that uncontrolled mixing of wetting substances is minimized between sectors; (3) that the wetted sectors of the first and second chambers are sequentially ordered so that heat transfer between the first and the second chambers will occur in a manner so as to continually change the temperatures of the segmented wetting substances in one direction along the chamber lengths; and (4) that while wetting a sector, which also includes its heat exchanging partition area, the bulk of the wetting substances remain within a sector a required time duration for: (a) their temperature to follow the temperature of the gas within that sector and/or the temperature of another segmented wetting of a second chamber sector thermally connected to the first chamber sector and/or the temperature of the gas thermally connected to that chamber sector; and (b) a predetermined level of evaporation or condensation to occur into or from any present gas stream as induced by the vapor-liquid equilibrium imbalance associated with the gas and the wetting substance.

Migratory movement of the wetting substances for a plurality of sectors can be provided. This migratory movement means: (1) the actual movement of the wetting substance into and out of a sector where the wetting substance when exiting a wetted sector has at least one selected property that is different than the same selected property when the wetting substance entered the wetted sector, where a selected property is the temperature or the concentration of a wetting substance; and (2) that some portion of the wetting substances of a wetting sector exits that sector to enter an adjacent wetting sector. This migratory movement between sectors allows a wetting substance property of one sector to influence the same property of an adjacent sector, this sequence being repeated throughout a plurality of wetted sectors obtaining at least one overall directional movement of these wetting substances combined with sequential change in at least one selected property. Migratory movement rate is controlled by addition to or subtraction from the chamber wetting substances by any means causing the required time duration of the wetting substance within a wetting sector to be achieved.

In operation, where there is evaporation from these wetting substances into the gas stream or selective condensation from this gas stream, segmented wetting coupled with migratory movement provide the following occurrences. First, as a sector is wetted by primarily the same wetting substances, the now localized wetting substance properties can be forced to change. Second, as the migratory movement is from one sector to another, the concentration of one sector influences the wetting substance composition of the subsequent sector where it again may be altered by evaporation or condensation. In this manner, selected substance property gradients can be developed and maintained throughout the chamber length. For example, a brackish water feed can be introduced at a chamber end, establishing because of evaporation and migratory movement a continually higher concentration in each adjacent sector, and can be extracted as brine or crystals. The condensate, collected in the other chamber, would be purified water.

The apparatus for carrying out the invention generally consists of at least a first and a second chamber. A gas is moved into the first chambers by mechanical means which can be a low pressure blower. Most often the gas flows of these first chambers and then of the second chambers are substantially counter-current. Multiple liquid segmentations generally caused by segregated pumping and distribution means are provided. This distribution generally encompasses wetting of the heat exchanging partitions, but may further include wetting methods to increase chamber gas and wetting substance contact area, for example, the use of droplet sprays or incorporation of packing. The number of segmentations is sufficient to allow the wetting substance temperature to approach the temperatures of the passing gas proximate thereto and also preserve any significant concentration variances developed within these wetting substances. Provision for migration movement of these wetting substances in most cases from sector to sector over the length of the chamber can normally be by basins contained within the chamber. The chambers are thermally connected by heat transferring partitions which are exposed on opposite sides to fluids of the first and second chambers. These fluids always consist of a segmented wetting substance of one chamber while the fluids of the other chamber further include a liquid resulting from condensation, of a gas stream. The partitions, usually of plastic film or metal sheet, generally provide a common boundary between the first and second chambers, but on occasion may be located externally to the chambers. Flexibility of partition location is limited by the degree of sector wetting. Referring to the above brackish water concentration example, the chamber providing for evaporation would be segmentedly wetted generally throughout its length while the condensation chamber may be optionally segmentedly wetted. If not segmentedly wetted, the condensation heat released from an ever descending gas temperature throughout the chamber length transfers through a heat transmitting partition forming a common boundary with the evaporation chamber. In the event that the condensation chamber is segmentedly wetted, the condensation heat transfers to the wetting substances of that chamber. The heat transferring partition may then be at least partially separate from the chambers with sector heat transfer accomplished by the wetting substances of the respective chambers. In applications where one chamber heat transferring fluid is a gas, the partition is physically located between the two chambers in direct heat transfer. External temperature changes are primarily created by auxiliary heat exchange from a multitude of supplies to the gas generally after it leaves the first chambers, but before it enters the second chambers. In some functions, the gas can be recycled to create a closed system wherein this gas can be air or other noncondensing gas such as helium, nitrogen or argon. While the gas is generally inert, in some cases the gas may be reactive, for example nitrogen, hydrogen or chlorine.

The invention can be presented in terms of heat transfer and mass and energy balances. The conduction of energies between chambers always involves sensible heat and, generally, at least one latent heat transfer related to evaporation or condensation. Sensible heat is that heat required to change the temperature of a substance without changing the state of the substance. Latent heat is that heat required to change the state of the substance from solid to liquid or from liquid to gas without change of temperature or pressure.

A basic heat transfer is established by the auxiliary heat exchange to the gas before this gas returns to the second chamber. This exchange causes a temperature differential between the gas in each chamber. In order to preserve this temperature differential along the chamber lengths, the gases are made to flow in a thermally counter-current direction in the first and second chambers. This thermally counter-current gas movement results from the thermal connection between the sequentially ordered sectors of the first and second chambers by means of the heat transferring partitions.

The continually changing temperatures of the gas within the chambers cause a continual shifting of the vapor-liquid equilibrium value between the liquid and gas phases. This shifting allows evaporation and/or condensation between the moving gas and the wetting substances. The energies released in condensation are normally transferred to the other chamber allowing for additional evaporation to occur from the wetting substances. Where many sectors are wetted, as in the case of the concentration and fractionation modes of the invention, these transfers of latent energy are many times the sensible energy related to the temperature change of the gas. This sensible exchange, in turn, is greater than any auxiliary heat exchange into the gas. In other operating modes, for example, air cooling, the latent energies associated with evaporation from the segmented wetting substances can be turned to sensible energies in that such evaporation can cause the gas to further lower in temperature.

Generally speaking, minimum wetting substance movement occurs when energy transfer between chambers involves exchange directly through wetted partitions separating the chambers. However, there are occasions when this minimum is balanced against other rates. One concern is the rate of energy conducting through a certain partition area including liquids on the partition, called the partition heat transfer flux. The partition heat transfer flux is maximized if the temperature difference across the partition is increased to a maximum value of the specified temperature differential between chambers. If a chamber partition operates below its maximum heat transfer flux capability, this flux often can be increased by augmenting adjacent latent energy transfer which transfers through the partition as sensible energy. This augmentation involves inclusion of additional gas/liquid heat transfer contact area beyond that supplied by wetting the partition, for example, by the use of spray droplets within the chamber area. This expansion of latent transfer surface, for instance, has been found useful in the gas cooling and heating modes of the invention. Conversely, in other cases such as some concentration operations of the invention, latent transfer within the chambers is capable of being in excess of the maximum partition flux. When both chambers are segmentedly wetted, an increased partition area can be supplied by thermally connected partitions that are external to the chambers. In this manner, the partition heat transfer flux can operate at its maximum along with increased chamber sensible and latent heat transfer.

For most applications, the above transfers can be understood by viewing two mass and energy balances: an external overall balance encompassing the entire process, and, an internal balance around a chamber. A net overall mass and energy balance encompassing the entire process includes the enthalpy of the incoming gas plus the input energy to this gas from an auxiliary heat exchange all being equal to the enthalpy of the exiting gas. In some modes of operation, there is also the enthalpy of a feed material and the enthalpy of a product material, as for example in concentration which may involve an incoming brackish water and products of substantially pure water and brine concentrate. However, due to feed/product heat exchange capability or injection/withdraw of these materials where they have no significant energy effect, the energy associated with these feeds and products tends to either cancel or be made inconsequential. The above energy balance reveals that where both gas streams are saturated and the auxiliary heat exchange adds energy, for example in the concentration and fractionation modes of the invention, there would be a shift in temperature of those gas streams in the same direction as the shift in enthalpies. In this way the gas stream with the highest enthalpy (and highest temperature) would be associated with the cooling or condensing chamber allowing its energy to be transmitted to the lower enthalpy (and lower temperature) gas stream located in the heating or evaporation chamber and thereby reused. In the air cooling mode of the invention, the same enthalpy relationships are evident. An entering hot unsaturated ambient air remains unsaturated in the first chamber and receives energy from a dwelling or storage space but then remains saturated throughout the second chamber. Owing to the differences in saturation, there can be a shift in temperature of those gas streams in the opposite direction as the shift in enthalpies. The gas stream with the lowest enthalpy (but highest temperature) would be associated with the cooling chamber allowing its energy to be transmitted to the higher enthalpy (but lower temperature) gas stream located in the second chamber. In summary, the external balance establishes the net enthalpy offset and therefore the temperature difference between the two chambers and the net amount of liquid that may be evaporated or condensed. An internal chamber energy balance gives detail on the actual amount of temperature rise or fall in a chamber and on the actual amount of liquid evaporated or condensed in a chamber.

An internal mass and energy balance around a chamber equates the incoming gas enthalpy to a chamber plus the conducting energies associated with the partition to the exiting gas enthalpy from a chamber. The two forms of conducting energies are; (1) sensible energy needed to heat up or cool down chamber gas, and (2) latent energy needed for evaporation or condensation into or out of the chamber gas. The internal chamber balance also relates the chamber exiting gas temperatures (enthalpy) to the amount of sensible and latent energies that can transfer to the gas in a chamber. The more energies that can transmit to the chamber gas the larger will be the temperature rise and fall and actual evaporation into or actual condensation out of the chamber gas from the chamber entrance to chamber exit.

For any adjacent chambers, the sum of the sensible and latent energies transferred through the heat exchanging partition tends to cancel although the amounts of sensible or latent exchange may vary on each partition side. Owing to this cancellation, the net energy balance for the two chambers or for that matter all chamber sets (the enthalpies of their entering and exiting gases) plus the auxiliary heat exchange again gives the net overall mass and energy balance encompassing the entire process.

These and other features of the present invention will be understood upon reading of the following description along with the Figures.

BRIEF DESCRIPTION OF THE DRAWINGS

FIG. 1 is a plan view, with portions broken away, of a device according to the present invention with an auxiliary heat exchanger unit, optional supplemental gas cooler and gas movement shown schematically;

FIG. 2 is a cross-sectional view taken along line 2—2 of FIG. 1 with portions shown schematically;

FIG. 6 is a horizontal sectional view, with portions broken away and portions shown schematically, of a device of the present invention showing vapor absorption adjustments;

FIG. 8 is a perspective view of an alternative multiple channel device of the present invention.

FIG. 9 is a horizontal sectional view taken along line 9—9 in FIG. 8;

FIG. 10 is a vertical sectional view taken along line 10—10 in FIG. 8;

FIG. 11 is a horizontal sectional view taken along line 11—11 in FIG. 8;

DETAILED DESCRIPTION OF THE INVENTION

Figure 3:
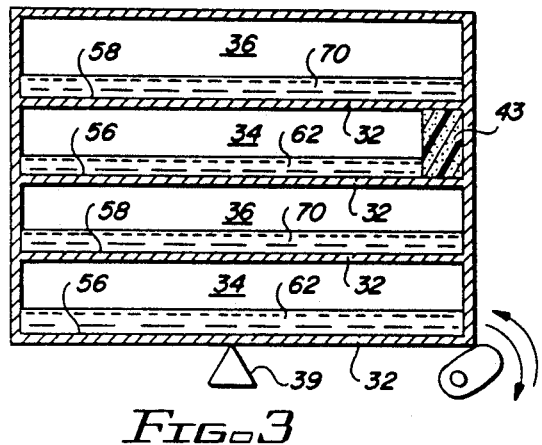
FIG. 3 is a cross sectional view of an alternative positioned device of the present invention oriented horizontally.

Referring now to FIGS. 1 and 2, a device of the present invention is shown and generally indicated by the numeral 14 along with auxiliary heat exchanger unit 15 and optional gas cooler 16 and gas movement unit 17, with gas movement shown by ducts 18. Device 14 is shown as a rectangular parallelepiped having side walls 19 and 20, end walls 22 and 24, top wall 26 and bottom wall 28 with these walls usually insulated with insulation 30. As schematically shown, partition 32 separates device 14 into two chambers: chamber 34 which in most applications serves for evaporation, and chamber 36 which normally allows for condensation. In this configuration, these walls and partition are generally oriented vertically or nearly so although units with horizontal or inclined orientation as well as with curved surfaces or shapes where one channel may be a series of tubes can be acceptable. The length of these chambers normally ranges from under 2 to 12 meters and from less than 1 meter in height to a limit largely dictated by material availability of between 2 and 3 meters. The width of each of chambers 34 and 36 is shown somewhat disproportionately in the drawings for clarity, the chambers previously constructed have widths varying from 3 mm to 15 cm, although other widths may be used. Chamber length, height, and width dimensions are generally consistent throughout any device 14 although they may vary. For example, chamber 34 may have a different width than chamber 36, all chambers 34 or 36 may not have the same width, and the height or width dimensions of the channels may be different along their length. Partition 32 serves as a heat conducting surface and preferably is a mechanically coherent sheet selected from the group of plastics, metals, inorganic glasses or their components. One suitable sheet at operating temperatures approaching 85 degree C. is a plastic film consisting of a woven web of low density polyethylene laminated on both sides with polyethylene film which has been made wettable by a treatment reducing its surface tension on at least one exposed side. A second sheet suitable for moderate and higher operating temperatures is an annealed cold-rolled stainless steel foil. In higher pressure applications and in cases where the pressures are significantly dissimilar on each partition side, more sturdy materials including stainless steel sheet would be used. In some cases, the partition surface may be further treated, for example, by the surface deposition of a catalytic material such as platinum metal or iron oxides, where the gases may be reactive with themselves or with the wetting substance. The wall structure may assist in maintaining the width dimension of chambers 34 and 36 through use of attached spacers which offer little restriction to gas or liquid flow, or by utilization of a rough textured material or one where "dimples" are formed during its fabrication. Insulation of a small portion of either side of partition 32 may be desirable and such insulation 38 shown within chamber 36 may be any efficient and highly vapor and liquid resistant material or they may serve as a catalytic material.

Containers displayed here as basins 40 and 42 are utilized for liquids present in respective chambers 34 and 36. Inlet 44 is provided for feed liquids and is generally located at a point where the temperature and composition of a feed material closely approximate the liquid temperature and composition in basin 40. In applications where a liquid product is produced, a heat exchange between basin and feed liquids is preferred as a means to maximize the energy efficiency of the device.

In certain desalination cases, for example, such heat exchange may increase the performance factor by 30%. With internal feed liquid heat exchange, the feed liquid entering via port 44 passes through conduit 46 which is shown located such that heat transfer may take place between the liquid contained within and the liquids of basins 40 and 42. Heat transfer may also take place in an external heat exchanger where liquids are removed from basins 40 or 42, or both basins, and heat exchanged with an external conduit 46 using any suitable liquid-to-liquid heat exchange equipment. The liquids may be segmentally withdrawn from basins 40 or 42 to this heat exchange unit and returned thereto in order to preserve liquid temperature and concentration profiles within respective basins. Alternatively, in devices containing a plurality of chambers, one or more chambers may be sealed and converted to feed liquid heating wherein the feed liquid entering a basin 40 segmentally wets the partition in the manner described below and receives energy through partition 32. Following any of these alternatives, conduit 46 may then connect with auxiliary heat exchange unit 15 to supply liquid for evaporation and that liquid portion not evaporated returned to basin 40 via entry 48. Basin 40 has a discharge port 50 for removal of liquid therefrom while basin 42 has discharge port 52 for removal of liquid therefrom. Multiple ports 50 or 52 may be employed at different locations along basins 40 and 42 if the addition or removal of liquids of varying concentrations or temperatures is desired. Condensate can be removed from cooling device 14 at discharge 54 where optional supplemental cooling device 16 is employed or if liquid scrubbing to remove vapors from the exiting gas is utilized.

Partition 32 may be wetted on side 56 facing chamber 34 and on side 58 facing chamber 36 by alternate means that allow temperature variances of the wetting liquids and composition differences within these wetting liquids to be segmented along the partition. The preferred segmented wetting means relies upon the division of the partition length into many sectors indicated by the numeral 60 where the mixing of liquids between these sectors on partition 32 does not occur to any appreciable extent. Partition wetting within each sector may be accomplished by various means. Liquid 62 can be removed from basin 40 via port shown generally by the numeral 63 and returned to the top of chamber 34 via pump 64 and port 65 where it is discharged to side 56 of partition 32 through distribution means 66 which is shown here as a perforated plate in length equal to sector 60 and terminated by blockages 67. A plurality of these pumping and distribution apparati having their basin discharge ports 63 located as 63A through 63E centered within their sector 60, for example, may provide a full partition wetting but maintain liquid temperature and applicable concentration integrity through the length of basin 40. However, as flow of liquid 62 within basin 40 is possible, some migratory movement from inlet 48 to discharge 50 may transpire or the migration can be in the opposite direction, for example, an inflow at port 50 and an exit at port 48. In the same manner, liquid 70, can be removed from basin 42 through port 71 and returned to the top of chamber 34 via hydrodynamic modulator 72 through port 73. Discharge is side 58 of partition 32 is through distribution means 74 which is shown as a spray nozzle. A plurality of these distribution apparati each spraying a sector area with discharge ports 71A through 71E centered in their respective sector 60 allow basin liquid integrity. As the flow of liquid 70 is not restricted, some migratory movement to discharge 52, may take place.

In operation, hydrodynamic modulator 72, an alternative to individual pumps 64, when at rest receives basin liquid 70 through check valve 23. On a periodic basis a primary working fluid, which is generally an inert gas such as air or may be a liquid, is injected into hydrodynamic modulator 72 at port 21. This pressurized primary working fluid causes closing of check valve 23 and displacement of liquids from hydrodynamic modulator 72 through port 73. Following release of this pressure optional check valve 25 closes, check valve 23 opens, and the primary working fluid is released via port 21 thereby again allowing basin liquid 70 to enter hydrodynamic modulator 72. This cycle may be repeated over various time intervals with satisfactory partition wetting, for example, developed at a frequency of up to 30 cycles per minute. In an optional configuration expandable diaphragm 27 may be employed to separate the basin liquids from the primary working fluid thereby allowing a wider choice of primary working fluids, even admitting these liquids to be the same. A means of supplying the primary working fluid to hydrodynamic modulators 72 is likewise shown in FIG. 2 and consists of two closed containers 45 and 47 which may be pipes sized to contain the necessary volumes, a working fluid mover 49 which in most cases is a pump although for gaseous fluids may be a compressor or high pressure blower, and two three-way valves, 51 and 53 which may be rotating directional or solenoid activated. In operation a secondary working fluid which may be water is pumped by working fluid mover 49 through valve 51 into container 47 while valve 53 prevents its discharge from this container. The resultant increased secondary working fluid volume within container 47 causes primary working fluid displacement from the container into hydrodynamic modulators 72. Concurrently, secondary working fluid to working fluid mover 49 is supplied from container 45 through valve 53 with the needed increased primary working fluid volume to permit this secondary working fluid exit available from a second bank of hydrodynamic modulators 72 with this primary working fluid entering container 45 at port 55. The secondary and primary working fluid traffics are then reversed by valves 51 and 53 to the alternate hydrodynamic modulator banks while working fluid mover 49 maintains a steady output.

In certain applications of the invention, solids may be formed in liquid 62 which may be removed at port 50. These solids may be separated for size by passing through a product screen, elutriator, or any such size classification device 68 with the now separate product streams discharged through ports 69A and 69B. Also, solids removal may be affected throughout the length of device 14 as an in-line settler or classifier 57 can be placed between any port 63 and inlet 65 such that solids could settle and be removed via discharge 59. In other cases small solids normally called "fines" may require destruction with another in-line settler 61 incorporated between a port 63 and inlet 65 such that liquids containing fines may be removed from the top of the in-line settler 61.

For certain applications, basin liquid recirculation may be eliminated or minimized by incorporating liquid velocity inhibitors such as felts on partition 32. Liquids under municipal line pressure could wet partition 32 a single time with any overflow discharged from device 14. In the same mode, all removed liquid from basin 42 may be returned to the distributors by a single pump. Other limited flow partition methods may likewise be utilized, for instance the employment of capillary action from basins 40 and 42 following bonding of porous materials to partition 32. In these cases, as the energy content of the liquid flow is relatively small, a continual temperature segmentation may be developed throughout wetted sectors 60. However, any liquid composition changes are more limited and ubiquitous thereby reducing the effectiveness and energy efficiency of the invention.

Control of wetted surfaces likewise may be incorporated within a horizontally orientated device 14. A multiple stack of chambers 34 and 36 is shown in FIG. 3 incorporating a plurality of heat transfer partitions 32. In this arrangement, perhaps only half of surfaces 56 or 58 of chambers 34 and 36 may be fully wetted. Maintaining temperature and composition integrities of the liquid film within a horizontal chamber 34 and providing migratory movement from sector to sector can be regulated by the feed rate to chambers 34 and by placement of flow directors on the partition. Developing channels generally perpendicular to the length of device 14 by flow directors whose height approximates the water film thickness maximizes retention time within each sector 60. For example, a liquid surface flow rate of 0.7 cm per minute (twice the bulk flow rate) has been observed when supplying 10 cm wide passageways at 100 ml per minute. In other flow director geometries, a thin film liquid flow is directed across the width of chamber 34 where it then travels on partition 32 through flow restrictions placed crosswise to the length of chamber 34 to prevent liquid channeling. In general, a thinner liquid film on partition 32 may be achieved with mechanical agitation of a horizontal device 14. For example, a slightly off-center fulcrum 39 allows revolving cam 41 to alter the slope of partitions 32 in a back and forth oscillation. This action has allowed an average liquid film depth of 0.8 millimeter to provide at least a 95 percent wetted surface on partition 32 when utilizing the four ply film described earlier. One specialized partition architecture developed for the oscillating device includes shaded area 43 shown as an open cell foam which provides isolation from carrier gas movement. With area 43 depressed a basin in function similar to basin 40 of FIG. 2 is formed extending the chamber length. These liquid control methods may likewise be applied to chamber 36, but with gas movement usually co-current to the overall liquid flow.

Figure 4A:
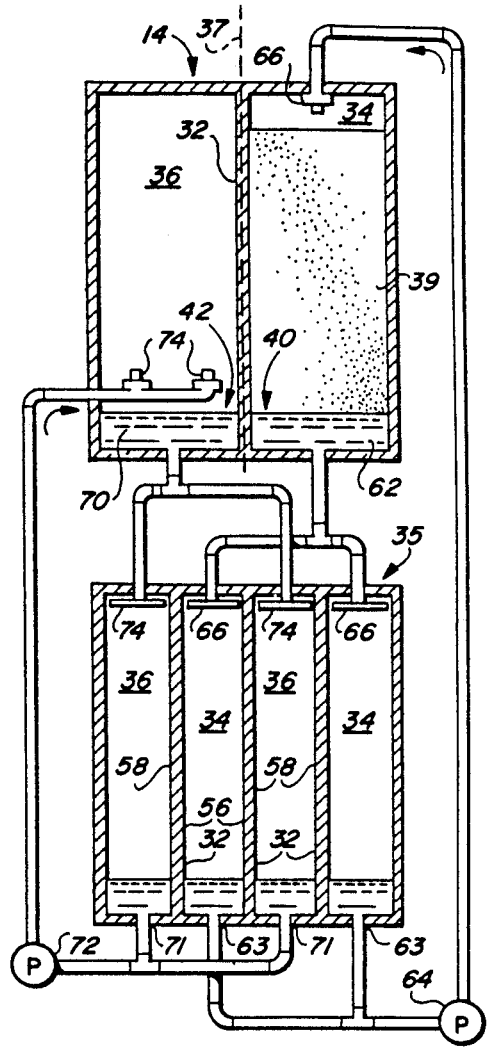
FIG. 4A is a cross sectional view of a device of the present invention schematically showing an alternate chamber configuration with separately contained heat exchanging partitions.
Figure 4B:
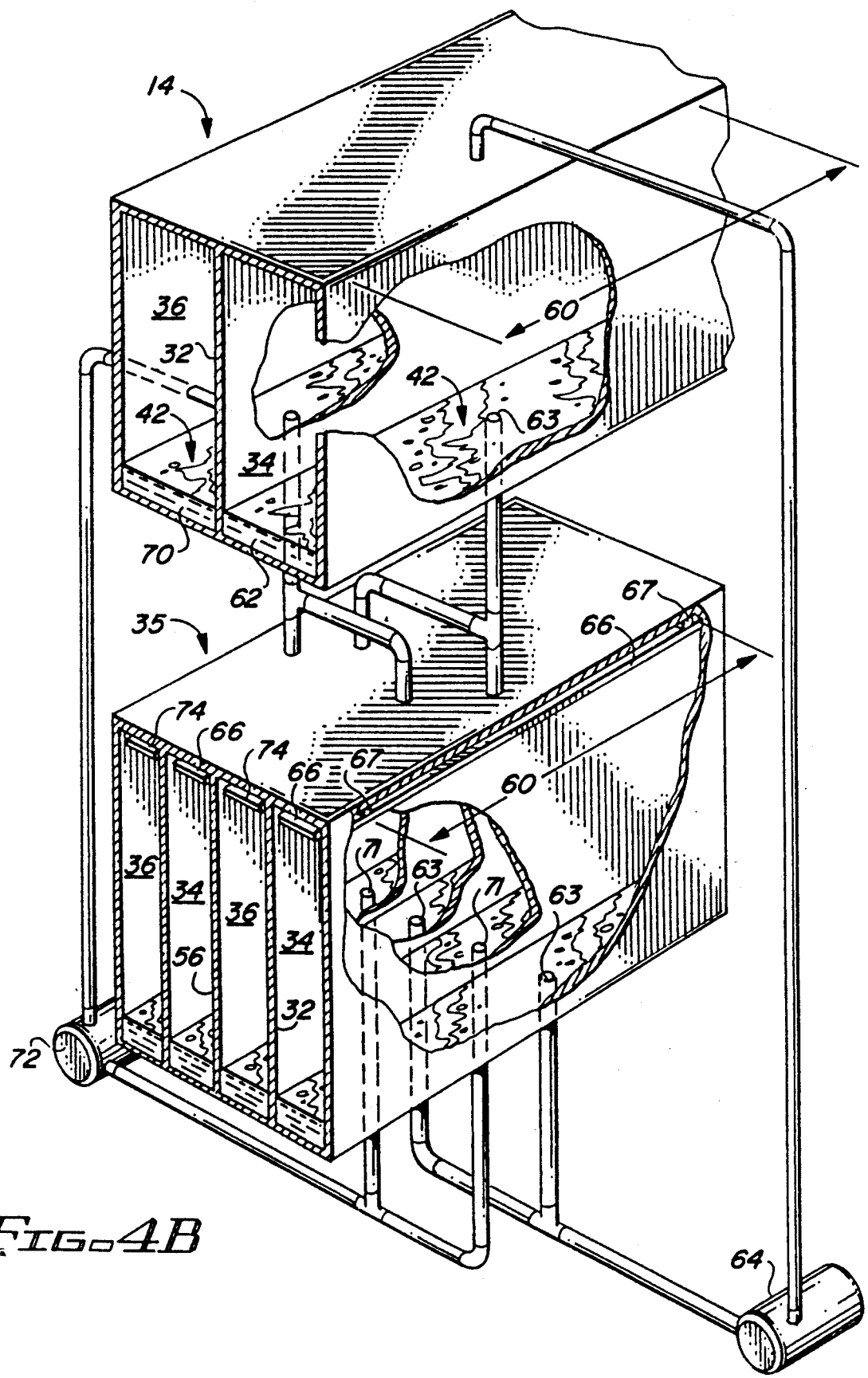
FIG. 4B is a perspective view, with portions broken away, of the alternate chamber configuration and separately contained heat exchanging partitions of FIG. 4A.

Referring next to FIGS. 4A and 4B, an alternative configuration of chambers 34 and 36 of device 14 is shown where the chambers are thermally connected to a separate channel set 35 containing partitions 32 which provide for liquid to liquid heat transfer. Chambers 34 and 36 may share a common partition 32 or the chambers may be physically separated along division line 37. Partition 32 is then replaced by nonconducting walls such as walls 19 and 20 of FIG. 1 with all thermal transfer between chambers 34 and 36 taking place by liquid to liquid heat exchange through partitions 32 of channel set 35. Gas movement occurs only in the chambers and gas to liquid surface area may be augmented by causing distribution means 66 and 74 to be spray devices which may have upward or downward directed spray. Further, packing materials 39 shown as a pad in chamber 34, but may be open cell foams, rings, or other shapes may be employed in certain instances to increase available surface area within a given space. Within a sector 60, liquid 62 from chamber 34 is directed to channel set 35 to a second set of distributors 66, shown as perforated plates, in alternate channels (illustrated as extensions of chamber 34) wetting sides 56 of partitions 32. Likewise, liquid 70 of chamber 36 would be distributed in alternate channels of channel set 35 (identified as extensions of chamber 36) by second distribution means 74 along partition sides 58 of partition 32. Heat transfer is accomplished by thin falling films of liquid on each partition side. In other heat exchange means, the channels can be flooded, thereby offering a more conventional means of liquid to liquid heat transfer such as is found in plate and frame heat exchangers. Return of liquids to the chambers is by pumps or other liquid movement means 64 and 72 from outlets 63 and 71. Migratory liquid movement between sectors generally takes place in basins 40 and 42 of chambers 34 and 36, but could be located in the channels. In FIG. 4B, a perspective view of FIG. 4A, a corresponding sector 60 of device 14 and channel set 35 is shown. Describing chamber and channels 34, liquid from chamber outlet 63 is distributed within alternate channels of channel set 35 by perforated plates 66 wetting partition 32. In this distribution means, liquid is contained within the channel sector by blockages 67 of plates 66 at the ends of the sector. Liquid is withdrawn from channel basins via port 63 which is generally centered within sector 60. Unintentional mixing of these basins is minimized as liquids of adjacent basins share a common depth. In other configurations, the blockages could extend the full height of the channel, preventing any liquid mixing between the sectors. Liquid return to chamber 34 and control of chamber sector wetting is as previously described.

Referring again to FIG. 1 auxiliary heat exchange unit 15 may be any supply or device that causes a gas stream within the initial portion of chamber 36 to be of different temperature than the same stream leaving chamber 34. A simple supply is a feed liquid of elevated temperature where upon entering chamber 34, part of its heat is transferred through partition 32 to the gas stream within chamber 36. In another direct heating alternative, unit 15 may be a dwelling or other structure that heats a gas stream circulating through its interior. Auxiliary heat exchange unit 15 may be a separate device as shown in FIG. 1 or may be an extension of now heat resistant and insulated walls of device 14. Gas heating may be by steam or direct flame injection when water is the process volatile liquid. Another type of auxiliary heat exchange unit 15 may rely upon energy conversion. Solar energy may be employed where wall 75 is light transmitting admitting solar energy directly upon wall 76 which then radiates this energy. Provision to allow evaporation in auxiliary heat exchange unit 15 by wetting internal walls follow those methods described earlier. Another method for providing heat is by gas-to-gas or liquid-to-gas exchange. In one schematic using exchanging medium 93, for example, wall 77 would act as the heat exchange surface incorporating provision to allow evaporation within the confines of walls 32 and 77. Examples of external gas include the exhaust from a combustible process, air from a dwelling, or ambient air. Examples of liquid supply would be heated process waste stream or warm surface waters. In another heat exchange form, the gas stream may be changed in temperature by association with exothermic or endothermic chemical reactions within heat exchanger 15. For example, an exothermic reaction might include sodium metal and air or water, or heats of solution such as dissolving potassium carbonate and water. An endothermic reaction might be the dissolving of ammonium nitrate and water. Another device acting as auxiliary heat exchanger 15 for the concentration and fractionation operating modes of the invention would be compressor 94. Gas from chamber 34 would enter compressor 94 and exit at a higher pressure possessing a higher temperature. The as would continue under pressure throughout chamber 36 and be released by flow constrictor 95, which may be a valve, turbine or orifice plate, at the chamber terminus.

Means for cooling inlet gas can be provided by supplemental gas cooler 16. This unit may be separate or within the body of device 14 in the upstream part of chamber 34 with the carrier gas contacting wetted side 56 of partition 32. Preferably, a separate cooler 16 is provided with the carrier gas stream passing through chamber 78 and wetted by spray or internal walls. Were the gas stream recycled then utilization of unsaturated atmospheric air as a cooling medium would require utilization of an air-to-air exchange unit. This outside air could be chilled by spray or wetting the internal walls of chamber 79 with cooling effect transferred through wall 80. When other gases or liquids, such as cool stream or deep ocean water, for example, are employed as the exchange medium, cooler 16 can be any conventional gas-to-gas or liquid-to-gas heat exchange unit.

Means for moving gas through the chambers and appended to device 14 where the gas is generally, but need not be, in equal flow within each chamber is provided by gas movement unit 17. While gas movement unit 17 is shown prior to supplemental gas cooler 16, location can be at any point in the gas path. Further, gas movement can be supplied by two units, for instance, in dwelling air cooling or heating applications to minimize pressure change within the living space. In most operating modes, device 14 operates under nearly constant pressure which is defined as the gas pressure within device 14 omitting friction loss. In laboratory models using narrow channels, this friction loss has been minimal at 0.1% pressure reduction and larger devices postulate a pressure loss of less than 0.3% also at ambient pressure conditions. Gas movement unit 17 may then be a low pressure blower or fan or other type that delivers either a constant or pulsating gas movement. Alternatively, device 14 can be operated with greater frictional losses using high pressure blowers or compressors or other similar type equipment. In cases of widely spaced chambers, such as 6 cm or more, with gas velocity of only 1 to 3 meters per minute, further gas movement can exist within the chambers where this movement is in directions other than from one chamber end to the other. This movement can include natural or forced convections caused by liquid movement on the partition, liquid spray within the gas space, or by separate fans of low friction loss.

Figure 5:
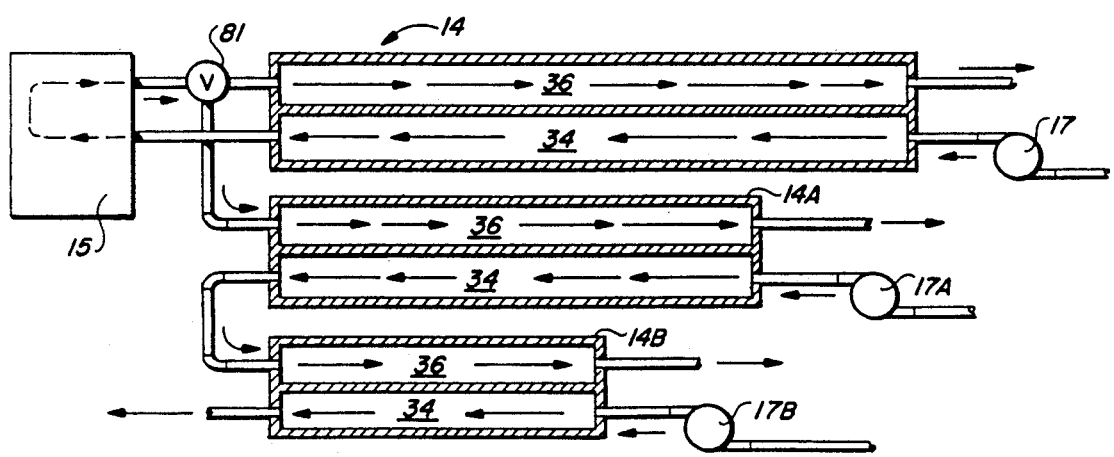
FIG. 5 is a horizontal sectional view, with portions broken away, of a paralleling and cascading group of devices of the present invention with auxiliary heater and gas movement unit shown schematically.

Now referring to FIG. 5, a device 14 of FIG. 1 is shown in combination with additional devices 14A and 14B. A gas flow director is shown as valve 81. The devices 14 are of analogous construction except that each downstream device is reduced in length when compared with the first device 14. While each device 14 is equipped with a gas movement unit 17A or 17B and may be optionally equipped with a gas cooler unit, only the upstream device 14 appends to an auxiliary heat exchanger 15.

FIG. 6, a horizontal sectional view similar to FIG. 1, displays an alternative embodiment of a device 14 wherein chamber 36 has been modified to provide for vapor or gas absorption. When device 14 is configured as a fractionator or stripper, and in some cases as a solids or gel dryer, some liquid is withdrawn from basin 40 at port 50 and is diverted by valve 86 to basin 42 via pipe 82. This liquid is generally segregated from the remainder of basin 42 by liquid retaining wall 88 in basin 42 and is withdrawn at port 90. When device 14 is structured as a stripper with vapor absorption capability, then a portion of the liquid diverted by valve 86 may also be diverted into basin 42 via pipe 84 which alternatively may be a series of ports along basin 42. Discharge of this liquid from basin 42 is at port 91. A less efficient method of vapor absorption throughout chamber 36 provides for a simplified basin construction where liquid retaining wall 88 may be omitted. In this case, liquids diverted by valve 86 enter basin 42 via pipe 82 and are removed from port 92.

Figure 7:
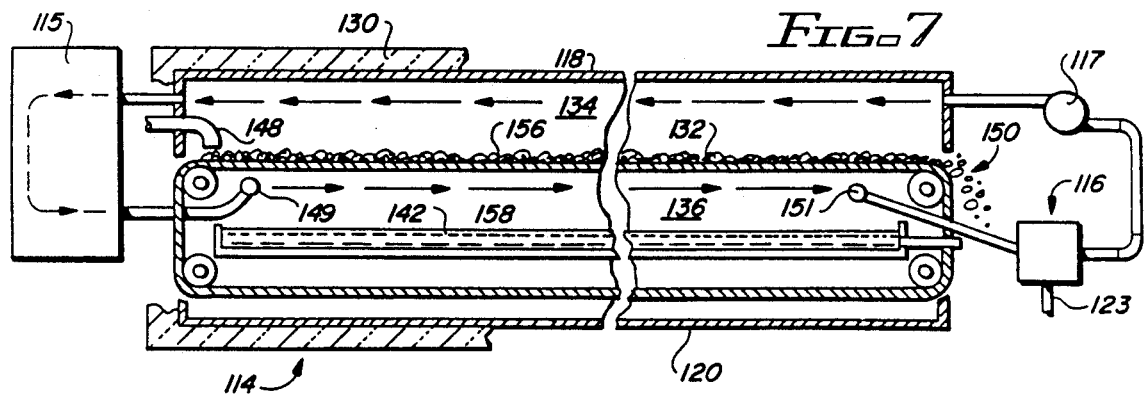
FIG. 7 is a vertical sectional view, with portions broken away, of a device of the present invention configured as a solids or gel dryer with an auxiliary heat exchanger unit, optional supplementary cooler and gas movement unit shown schematically.

Looking now to FIG. 7, a device 114 is shown in vertical side sectional view as an alternative embodiment as a solids and gel dryer. Device 114 has insulated walls 118 and 120. Partition 132 is a moving continuous belt which may be of any suitable material and separates device 114 into two chambers, 134 and 136. Basin 142, running the length and width of device 114, is utilized for collection of liquids present in chamber 136 while side port 152 provides for liquid discharge from basin 142. Entry port and distributor 148 spreads wet gels or solids thinly and evenly across partition 132 while their discharge from device 114 may be by gravity, scraping, or blowing at exit 150. Ports 149 and 151 provide for entry and exit for the gas stream entering and exiting chamber 136.

Concentration, Crystallization and Purification

The invention is partially directed toward a method of liquid phase concentrating, crystallizing or purifying wherein, for example, a salt solution may be further concentrated to a brine or mostly crystalline condition while obtaining a pure distillate. Chamber 34 is segmentedly wetted throughout its length while chamber 36 may be optionally segmentedly wetted. Partition 32 is a heat transferring chamber separation unless both chambers are segmentedly wetted. In that case, partitions may be located externally to the chambers as described in FIG. 4A and FIG. 4B. In operation, as schematically seen in FIGS. 1 and 2, a gas is caused to flow through air movement device 17 into evaporation chamber 34. The gas may be air below ambient temperature following its subjection to a cooler 16 or may be air at ambient temperature. The gas temperature is raised as it evaporates vapor from a salt solution which entered basin 40 at port 48. Energy for the evaporation of the salt solution and for continued gas heating is furnished by the opposite side 58 of partition 32 where condensation energy is simultaneously available. Salt solution temperature and concentration integrity is maintained by utilization of separate liquid distribution apparati each for wetting a chamber sector 60. salt solution is allowed to slowly migrate counter-currently to the gas and it eventually becomes concentrated or nearly crystallized and is then discharged at port 50. Of course, in cases where there are minor vapor pressure differences in these salt concentrations, the feed can enter at the cold end of chamber 34 via port 44 with the migratory flow now co-current with the gas flow and the concentrated salt solution removed at the opposite chamber end. Following saturation at ever increasing temperatures, the gas enters auxiliary heat exchange unit 15 where its temperature is further raised to about ambient when a gas-to-gas heat exchange unit utilizing outside air is employed or to higher temperatures when other heat forms are used. With an increase in temperature along with sufficient evaporation from the salt solution to maintain near saturation, the gas enters condensation chamber 36 with its temperature elevated above that of evaporation chamber 34. The resultant cooling to temperatures above that of evaporation chamber 34 which occurs along the length of chamber 36 until the gas exits device 14, causes its moisture to condense. The nearly pure water condensate is collected in basin 42 and discharged through port 52.

A concentrated solution can be further evaporated to form a saturated solution followed by solids production. Solids will form at a point in evaporation chamber 34 where the cooling and concentrating solution just saturates and will continue to form throughout the remaining chamber length. Normally, solids are removed from chamber 34 at port 50 but if present may be removed upstream, for example, from an in-line settler 57 via discharge 59. To aid in a selective precipitation process, materials may be added to basin liquids 62 at selected points. For example, a brine containing minor amounts of magnesium may precipitate magnesium carbonate by injecting sodium carbonate into basin liquids 62. Such injection within a sector 60 may cause immediate precipitation such that a substantially pure product can be removed from chamber 34 via a discharge 59, for instance, within that same sector.

In cases where a specific size of product solids is desired, device 14 may be equipped with a product screen, elutriator, or any such size classifier 68 at port 50 so that preferentially larger sized solids are removed from the classifier via port 69A and discharged. The smaller crystals, removed from port 69B, may be re-injected at a port 65 where the solution is saturated to remain in the system for further growth. To control small solids build-up, fines destruction may be employed whereby clear liquid containing these fines is directed from the discharge of an in-line settler 61 located in a cooler sector 60 and re-entered into a warmer sector 60 via a port 63 where the solution is undersaturated thereby effecting their dissolution.

In cases where the feed is highly concentrated salt there is a reduction of vapor pressure in evaporation chamber 34. This requires the gas entering chamber 36 to sensibly cool before the condensation can occur. This "dead zone" and resultant low performance factors can be partially overcome in two ways. The first is arranging a parallel/cascading assembly of devices as is shown in FIG. 5. After passing through auxiliary heat exchanger 15, a portion of the gas stream is not needed by condensation chamber 36 and is diverted by valve 81 to form a secondary gas stream. This stream is routed through condensation chamber 36 of the next downstream device 14A where it is cooled in chamber 36 by an additional gas stream in evaporation chamber 34 thereof. This gas stream exits several degrees cooler than the stream entering chamber 36 and is directed to condensation chamber 36 of a third device 14A. Cooling of this gas and the resultant condensation is effected by a third evaporation stream that upon passing through chamber 34 of the third device is exhausted to the atmosphere. In the second method, a compressor 94 is used as auxiliary heat exchanger 15. Compressor 94 increases both pressure and temperature of the process gas and after its quench, the gas returns to chamber 36 in a saturated state thereby eliminating the "dead zone" effect while using only a single heat and mass transfer device.

In another method of reconcentration utilizing evaporating from a concentrated liquid feed stock, this feed can be caused to further concentrate by intimate contact with counter-currently moving unsaturated gas. Channel 34 is utilized with the gas stream expelled from the system prior to auxiliary heater 15 causing partition 32 to act as any exterior wall 20. The liquid feed solution enters chamber 34 at port 48 and migrates through the chamber, exiting at port 50. Segmented wetting of sectors 60 of chamber 34 is again employed allowing intimate vapor-liquid contact. In operation, an unsaturated gas stream propelled by gas movement unit 17 is introduced into chamber 34 and exits chamber 34 in an adiabatically cooler and higher humidity state. The liquids and gases in any section 60 of chamber 34 approach vapor-liquid equilibrium so that there is a continual evaporation of liquid from the feed solution accompanied by a continual humidification and temperature decrease of the gas. This evaporation, coupled with the liquid migratory movement counter-current to the gas stream allows a continual concentrating of the feed solution until its discharge.

Fractionation

Alternatively, device 14 can be used for fractionation wherein a more volatile liquid is separated from a less volatile liquid. The method follows that described for desalination set forth above with modification. Chambers 34 and 36 are segmentedly wetted by liquids from basins 40 and 42 to provide intimate vapor-liquid contact. This complete wetting of the chambers allows the maximum flexibility in the location of the transferring partitions 32. Previously divided basins 40 and 42 are now joined adjacent to auxiliary heat exchanger 15, and feed port 48 is now located where the feed liquid phase composition closely matches that of basin 40.

In operation, also seen in FIGS. 1 and 2, as a gas entering evaporation chamber 34 increases in temperature (again caused by energy released from the heat of condensation upon side 58 and transferred through partition 32) the most volatile component of the liquid will tend to evaporate preferentially to the lesser volatile liquid species. Basins 40 and 42 are each segregated as defined by segments 60, in both chambers. As a gas moves through evaporation chamber 34 at ever increasing temperatures, it gains volatile vapors thereby depleting the volatile species from the liquid phase. The gas, completing its passage through chamber 34, passes through auxiliary heat exchanger 15 and enters condensation chamber 36 at a temperature elevated above that of evaporation chamber 34. Upon cooling, the gas phase becomes richer in the more volatile species as, firstly, the lesser volatile species condenses preferentially thereby leaving the vapor phase richer in the volatile species, and secondly, the gas phase remaining in equilibrium experiences a richer volatile liquid phase which is moving counter-currently to it. A rich volatile liquid phase is produced from the condensing vapor/gas mixture as the gas moves to exit from condensation chamber 36 and this condensate is discharged from basin 42 via port 52, or multiple ports 52 along basin 42 if liquids or different concentrations are desired. In the event the gas still contains significant volatile vapors, an absorber may be made integral within chamber 36. As seen in FIG. 6, basin 42 is segregated by liquid retaining wall 88 into two sectors with the first and larger sector now containing port 91 and functioning as above described. A portion of the stripped liquid from port 50 is diverted by valve 86 and may be optionally cooled by any means prior to entering port 82 within the newly formed basin. This nearly pure liquid when distributed in chamber 36 absorbs vapors from the gas thus causing its depletion thereof. This liquid now moving counter-currently to the gas absorbs vapors becoming richer in vapor condensate and exits chamber 36 at discharge port 90. Any heat released from this absorption is transferred to chamber 34 thereby increasing the temperature of the carrier gas in chamber 34 and providing for evaporation within chamber 34. The gas, now expelled from device 14, may be released to the atmosphere or recycled first passing through gas movement device 17 and supplemental cooler 16 with a release of additional condensation at discharge 54 before entering chamber 34. Device 14 can be operated at any nearly constant pressure which is generally atmospheric although the pressure may be higher or lower than ambient if the device is housed within a chamber capable of withstanding the pressure differential.

Stripper

Device 14 can be modified for use as a stripping unit as follows: First, basins 40 and 42 are again separate as depicted by FIGS. 1 and 2. Second, inlet 48 is located at the end of chamber 34 near auxiliary heat exchanger 15. Operation of device 14 as a stripper is identical to fractionation insofar as preferential evaporation of the more volatile species in chamber 34 is followed by preferential condensation of the less volatile species in chamber 36. However, the basin separation preventing full counter-current liquid traffic as well as the feed inlet location prevent enriched phase compositions within the device. As required, the device 14 may incorporate the absorption modification as shown in FIG. 6 and as described for its use in fractionation.

Absorber

When separating binary mixtures composed of one highly volatile species, this volatile species tends to not readily condense within chamber 36. The separation by evaporation of the more volatile species takes place within chamber 34 as previously described. Chamber 36 now becomes a liquid absorber throughout its length. As seen in FIGS. 2 and 6, a portion of the stripped liquid from outlet 50 is diverted by valve 86. A first part of this diverted liquid is temperature adjusted to its receiving liquids and then injected into basin 42 via pipe 84 or multiple pipes 84 along chamber 42. This liquid is distributed in chamber 36 and absorbs the more volatile vapors from the gas as it moves towards optional liquid retaining wall 88 and exits at port 91. A second liquid part diverted by valve 86 may be optionally cooled prior to entering at 82. This nearly pure liquid when distributed in chamber 36 and migrating counter-currently to the gas and at ever increasing temperatures will absorb most remaining high volatile vapors from the gas. This liquid now exits basin 42 prior to wall 88 at discharge port 90. The heat released from this absorption along the length of chamber 36 is transferred to chamber 34 thereby continually increasing the temperature of the gas and providing for continued evaporation within chamber 34.

Solids or Gel Dryer

An additional function of device 14 is for solids or gel drying wherein wet solids or gels are placed in and dry solids or gels later removed from the evaporation chamber while the liquid evaporated is condensed and may be collected from the condensation chamber. The method follows that described for desalination but with alterations. Chamber walls and partitions separating the chambers are generally mounted in a nearly horizontal plane to facilitate adhesion of solids or gels to the partition wall, allow for their stationary placement, as well as maintain a solids or gel distribution of more uniform thickness. This horizontal partition is no longer structurally segmentedly wetted as the moisture content of wet solids or gels perform this function. Provision is made to move the solids from one end to the other end of the device normally by a traveling center partition, the movement of which serves as a migratory movement.

Specifically, referring to FIG. 7, gas which is normally ambient air, enters evaporation chamber 134 while wet solids or gels are generally placed into the opposite or warmer end of the chamber on side 156 of partition 132 by distributor 148 in a thin and nearly uniform sheet. As partition 132 is a belt moving such that the solids or gels are transported to exit 150, the gas and solids or gels move counter-currently. Solids or gels and the gas become heated by condensation energy occurring in opposite chamber 136 conducting through partition 132. Temperature of the solids or gels and their confined liquids increases in a segmented manner along with the carrier gas throughout chamber 134 with a constant shift in the vapor-liquid equilibrium between liquid and gas phases forcing moisture to evaporate. The solids or gels become increasingly drier with their migration movement on partition 132 and are removed from the cooler end of device 114 at exit 150 containing a specified moisture content. Following its temperature increase in evaporation chamber 134, the saturated gas flows through auxiliary heat exchanger 115 where its temperature is further raised. The gas then enters chamber 136 via side port 149 where it, because of its elevated temperature above that of chamber 134, begins to cool with its moisture condensing upon side 158 of partition 132. Heat from this condensation transfers through partition 132 causing increase in gas temperature within evaporation chamber 132 and attendant evaporation. This condensate may be collected in basin 142 and discharged from device 114 at port 152. The cooled gas exits device 114 at side port 151 and is usually expelled to the atmosphere. In certain cases, the gas may contain a vapor of economic value and be flowed through cooler 116 to obtain further condensation of enriched liquid which exits by port 123. As an alternative, an integral absorber subsystem as shown in FIG. 6 and described for fractionation and stripping may be employed.

Gas Cooling and Heating

Device 14 can also be utilized for gas cooling and dehumidification, and for gas heating. Some gas cooling or heating operations are open cycle, while others recycle the gas stream with a heat exchange at auxiliary heat exchanger 15 and incorporate a separate heat exchanger such as cooler 16. Working fluids for open cycle methods include water or brines acting as desiccants such as potassium carbonate, lithium halides. In closed cycle methods the working pairs may be at least a binary pair of pure component materials with one material having a greater volatility with the materials mutually soluble. Working pairs include glycol ethers or chlorinated solvents, freons, acetone and glycerol, ethanol and calcium chloride, water and methanol, among others. Except for gas cooling without humidity modification, both channels are generally segmentedly wetted. While this complete wetting allows flexibility in the placement of heat transferring partitions 32, in most cases these partitions separate the chambers owing to the limited heat transfer required through the partition relative to transfer in the gas to liquid interface.

In a gas cooling mode without humidity modification and referring to FIGS. 1 and 2, outside ambient air is brought into chamber 34 by gas movement unit 17. Throughout most of the chamber length, for example sectors 60 identified as 63A through 63D, the air becomes cooler by surrendering sensible heat to a still cooler evaporation chamber 36 opposite partition 32. The air stream, now cooled and generally unsaturated, may optionally be further cooled by adiabatic humidification. This humidification may take place within chamber 34 by wetting of sector 60 location 63E or in this or the other operating modes may take place in a separate chamber. The air stream is injected into the living or storage space (auxiliary heat exchanger 15). Alternatively, in this operating mode or others a heat exchange with space air 93 may be utilized wherein the air stream is wetted while passing by gas to gas heat exchange partition 77 of heat exchanger 15. Upon return the air stream, now elevated in temperature and lowered in relative humidity, is subject to cooling by adiabatic humidification within sector 60 location 71E or in this or other operating modes, separately in any evaporative cooler. The air stream, now cooler than its opposite counterpart, is caused to gradually warm throughout the length or chamber 36 by the energy conducting through partition 32 from cooling chamber 34. This temperature rise is minimized by segmented water wetting of chamber 36 thereby providing for evaporation from chamber 36 into the air stream and absorbing most of the energy conducted through partition 32.

In a second cooling mode incorporating humidity modification, a desiccant, which generally enters at port 48 flows counter-currently to the air stream and exits with its absorbed water via port 63C, 63D or 50. As the air continues through chamber 34, it continues to cool and decrease its absolute and relative humidity in accordance with the desiccant strength. In sectors dry of desiccant, air absolute humidity stays constant, while its relative humidity increases as the gas cools. Energy released by the condensation within this desiccant is conducted through partition 32 causing additional evaporation within chamber 36. The air stream, now cooled and unsaturated may be further cooled by adiabatic humidification and is then injected into the space. Upon return, the air stream now elevated in temperature and unsaturated, is processed as described above with segmented wetting applied throughout the length of chamber 36.

In a third mode of cooling a series of dehumidification and humidifications are created to reduce a gas stream to a temperature adequate to provide refrigeration capability. This mode may operate in open cycle or with gas recycle then utilizing many of the working pairs previously mentioned. In an open cycle design, ambient air enters chamber 34 and, depending on the relative humidity, may be cooled, for example, in sector 60 location 63A, causing an increase in its relative humidity. A desiccant stream wets sector 60 location 63B causing air stream dilution. Energy released by condensation within this desiccant is conducted through partition 32 causing evaporation within chamber 36. The still cooled air is subjected to adiabatic humidification, reducing its temperature and increasing its relative humidity as it passes by water wetted partition sector 60 location 63C. The further chilled air is again subjected to a liquid desiccant in sector 60 location 63D lowering its humidity. Before entering the refrigerated space the air stream may once again pass by water wetted partition at sector 60 location 63E further lowering its temperature. This sequence may be repeated beyond these here described and, in most cases each function would transpire over a number of sectors allowing for counter-current flow of liquids and gases. Upon return the air stream, now elevated in temperature and unsaturated, is processed as described above with segmented wetting applied and resultant heat exchange throughout the length of chamber 36.

In a fourth cooling mode, the device functions generally in a gas recycle manner to provide below water freezing temperatures. The working pairs include those discussed above. The operation follows that described for refrigeration with the solution of lower vapor pressure replacing the above used desiccants at locations 63B and 63D and the solution of higher vapor pressure replacing water wetting of partitions at locations 63C and 63E. In this recycling, device cooler 16 is employed whereby a gas to gas heat transfer is effected through heat transfer surface 80. The secondary gas stream 93 may be taken, for example, from a cooled inhabited space or from the refrigeration operating mode just described.

Turning now to a gas heating mode, chamber 34 serves for evaporation and chamber 36, this time wetted with a desiccant, for condensation. Outside ambient air is brought into chamber 34 by gas movement unit 17. Throughout most or all of the chamber length, for example sectors 60 identified as 63A through 63D, the chamber is segmentally wetted with water. The air stream temperature increases receiving its energy from condensation occurring in chamber 36. Attendant evaporation from the wetted partition further causes vapor saturation at the ever increasing temperatures. The air stream is then subjected to a liquid desiccant wetting at location 63E of sector 60 which causes an increase in its temperature resulting from the energy released during the adiabatic condensation of its moisture. After passing through the space, the air stream, now lowered in temperature and increased in relative humidity, enters chamber 36. This chamber is subjected to segmented wetting over its length with a liquid desiccant first wetting sector 60 located by 71A then while absorbing water gradually flowing counter-current in basin 42 to the air stream finally wetting sector 60 at 63E. The air stream moving through chamber 36 cools and condenses its vapor into the increasingly concentrated desiccant with the heat released by this condensation transferred through partition 32.

Inhabited or storage space temperature control can be effected in several ways. A first preferred method is operation in on/off cycles controlled by a thermostat. A second preferred method involves reducing or augmenting wetted sectors by thermostat control of simple pump on/off switches. Another method utilizes control of desiccant feed rates. Lastly, a method with more complex effects involves altering the gas rate.

Reconcentration of desiccants may take place by liquid phase concentration previously described or series arrangement as seen in FIG. 5 or in the fractionator method. However, in areas providing periods of warm temperatures with reduced humidity many reconcentrations may take place in the cooling device using dwelling heat as auxiliary heat exchanger 15. Air is treated in chamber 34 in the manner as described without humidity modification. Following return, air in chamber 36 is subjected to segmented wetting over its length with weakened liquid desiccant first wetting sector 60 located by 71e. This desiccant while giving off water vapor gradually flows in basin 42 co-currently with the air stream finally wetting sector 60 at 63E. The air stream moving through chamber 36 first adiabatically cools then prior to its exit gradually warms while absorbing moisture from the increasingly concentrating desiccant. The energy for this warming and evaporation is supplied from the warmer air stream of chamber 34.

Another reconcentrating alternative is effective whenever ambient air humidity is low enough to dehydrate the liquid desiccant to its concentrated level. As described previously, this separate reconcentrator uses an ambient air stream passing only through chamber 34 with the reconcentrating liquids in a migration movement counter-current to the air stream. In an alternative configuration using this type of reconcentrator, the desiccant may be removed from each desiccant wetting sector of device 14 and reconcentrated in a section of the reconcentrator and then returned directly to the same wetting sector.

Multiple Channel Apparatus

Now referring to FIGS. 8 through 13, a multiple channel device is shown incorporating the embodiments previously described with FIG. 8 representing a perspective view. Looking now to FIG. 9, device 214 comprises outside walls 219 and 220 and can be encased in additional insulation 230. Device 214 is divided by heat transferring partitions 232 into a plurality of chambers 234 and 236 and a separate chamber 280. Assistance in maintaining the width dimension of chambers 236 and 280 may be supplied by a helix of thin wire 245, such as 26 gauge stainless steel, spaced every 3 cm or so along their lengths. Means of gas flow to channels 234 is supplied by duct 246 and distributed to separate channels 234 by plenum 247. Gas collection from channels 234 is by plenum 248, generally equal in size to plenum 247, with discharge means provided by duct 249. Duct 249 connects to heat exchanger 15 of FIG. 1. Now turning also to FIG. 10, a sectional view of device 214 (shown at the termination of channels 234, 236 and 280), means of allocating the gas streams to only channels 234 is displayed. Sealing elements 250 block entry to chambers 236 and 280 from plenum 247. Vertical containment of the gas is provided by wall 251 separating the upper and lower plenums. An identical set of sealing elements and wall are found adjacent to plenum 248 to prevent short circuiting from chambers 234 to chambers 236.

Referring now to FIG. 11, means of gas distribution from auxiliary heat exchanger 15 to channels 236 of device 214 consists of duct 252 and plenum 253. Gas collection from channels 236 is by plenum 254 with discharge means from device 214 provided by duct 255. Sealing elements 256, also seen in FIG. 10 along with wall 251, prevent mixing of these discharging gases with gases of chambers 234 and sealed chamber 280 while an identical arrangement at the opposite ends of chambers 234 and 236 likewise prevent gas mixing.

Figure 12:
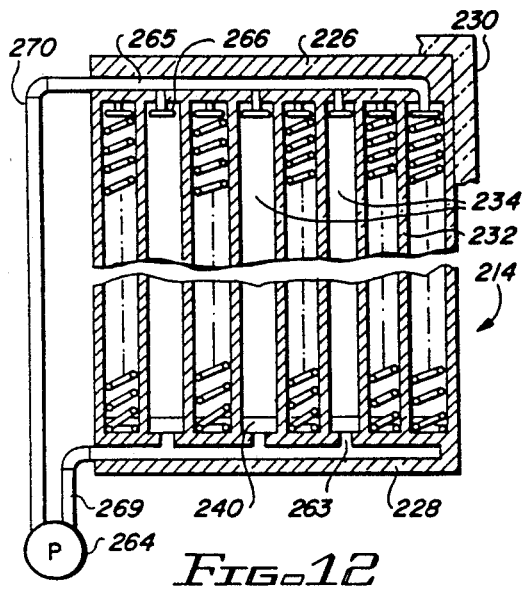
FIG. 12 is a vertical sectional view of FIG. 8 taken along lines 12—12 of FIG. 9.

Now referring to FIG. 12, a segregated wall wetting apparatus for chambers 234 is first shown where outlet ports 263 allow liquid movement from basins 240 through base wall 228 followed by connection to pump 264 via pipe 269. Pumped liquids return to device 214 through pipe 270, opening 265 within wall 226 and enter chambers 234 to provide almost equal chamber flow. Distribution within channels 234 is shown by distribution channels 266 which may be shapes that allow controlled seepage along each of their sides. A plurality of these collection, pumping and distribution apparati provide a wetting on each adjoining partition but maintains liquid temperature and concentration integrity through the length of basins 240.

Figure 13:
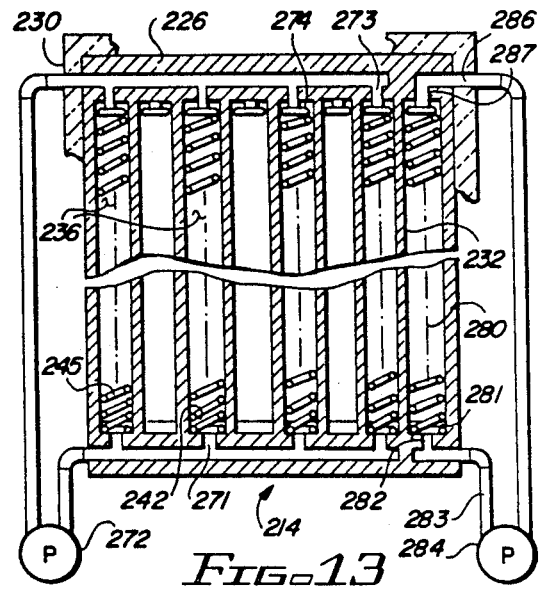
FIG. 13 is a sectional view analogous to FIG. 12 taken along line 13—13 of FIG. 11.

Looking to FIG. 13, an additional elevational plan view of device 214 displays a segregated wall wetting apparatus for chambers 236. Outlet ports 271 allow liquid collection from basins 242 and discharge to pump 272 with liquid return to device 214 is via ports 273 and distributors 274.

Liquids wetting the partitions of channel 34 and now channels 234 and channel 36 and now channels 236 are in heat exchange relationship. A portion of this heat exchange may be utilized to increase the temperature of an incoming feed liquid. An increase in temperature results from energy transfer from a chamber 236 which in addition to the energy contained in its wetting liquids generally contains heat released by condensation. Energy transfer is through partition 232 to a chamber 280. Gas movement through this chamber is eliminated by the combined sealing elements 250 and 256 as shown in FIG. 10. In order to transfer this heat of condensation to the feed liquids, the partition wall facing chamber 280, as shown in FIG. 13, is also segmentedly wetted throughout its length and contains a migratory flow. In the sector so shown, liquids from basin 281 are removed via outlet port 282 and delivered by pipe 283 to pump 284. Pumped liquids are returned to device 214 through pipe 285, wall opening 286 to enter chamber 280 and be distributed within the chamber segment by distribution means 287. Alternatively, channel 280 may be placed adjacent to channel 234 which normally serves for evaporation where the energy transfer would be from the partition wetting liquids of channel 234 to those of channel 280. Finally, in an alternate channel placement of FIG. 4A heat exchange to a cooler liquid may be along a partition separating chambers that are void of gas movement. Two adjacent chambers or multiple pairs thereof would be closed by sealing elements 250 and 256 while segmented partition wetting means as described above would remain in effect for these chambers.

Power Generation Means

Figure 14:
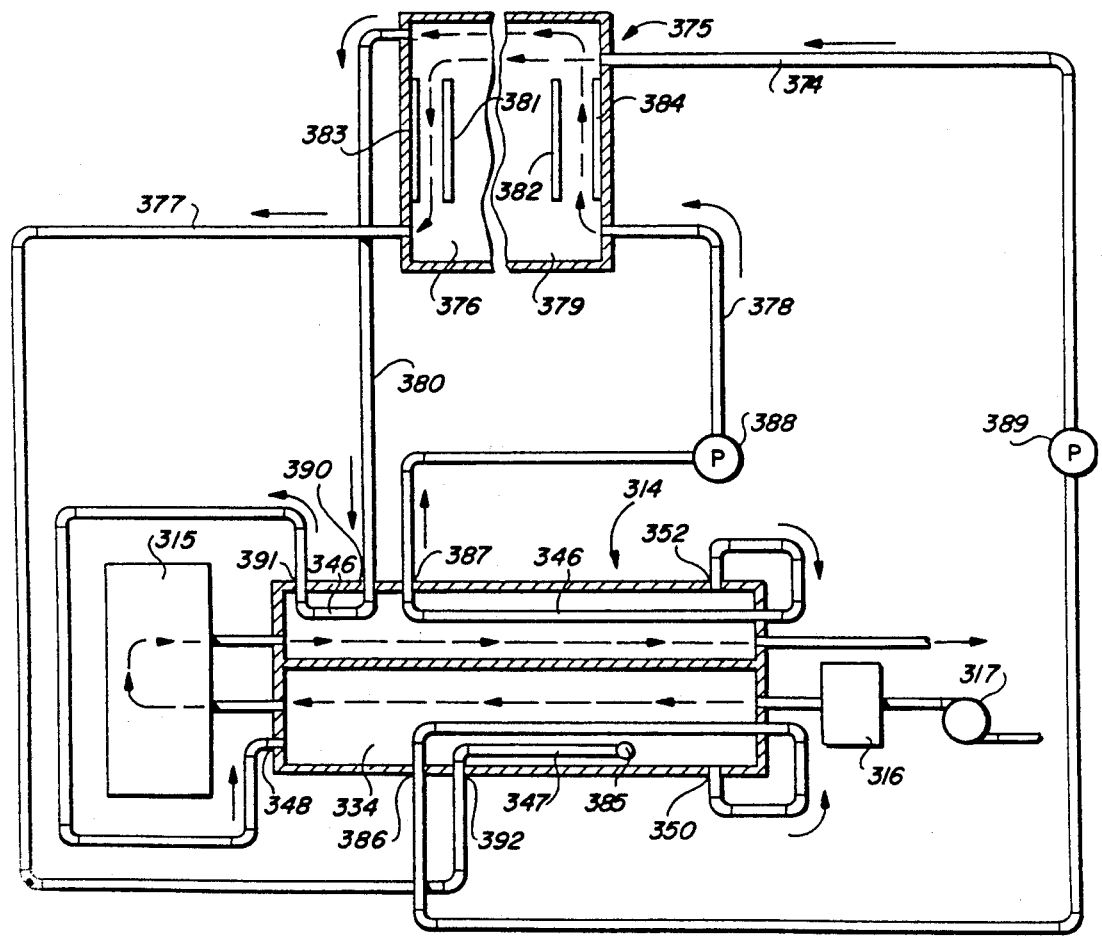
FIG. 14 is a schematic view of a device of the present invention coupled with a reverse electrodialysis power device.
Figure 15:
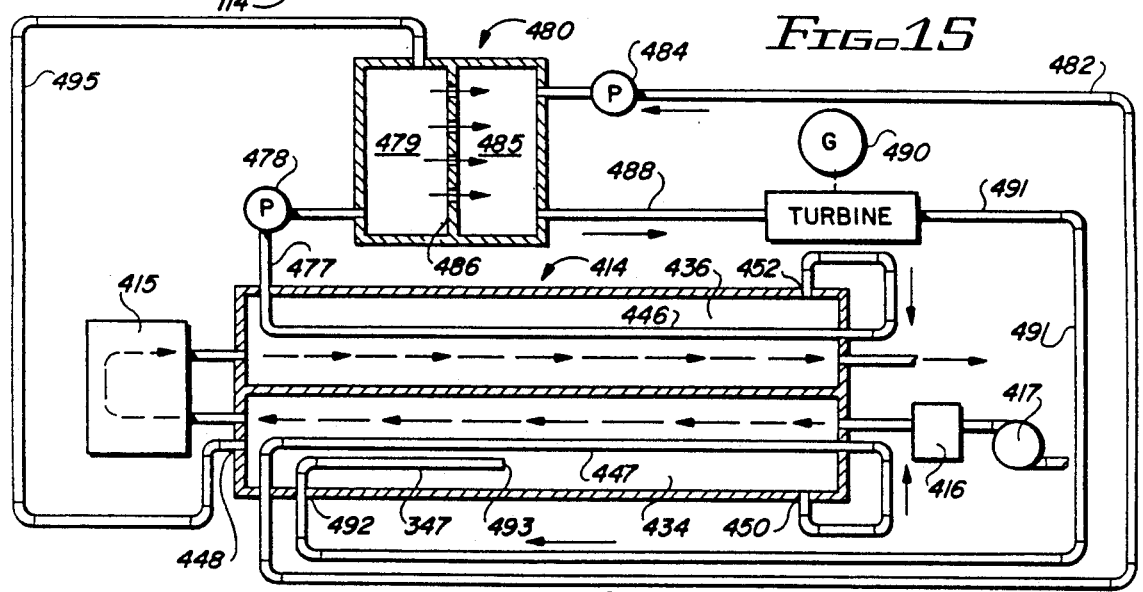
FIG. 15 is a schematic view of a device of the present invention coupled with a pressure retarded osmosis power generation device.
Figure 16:
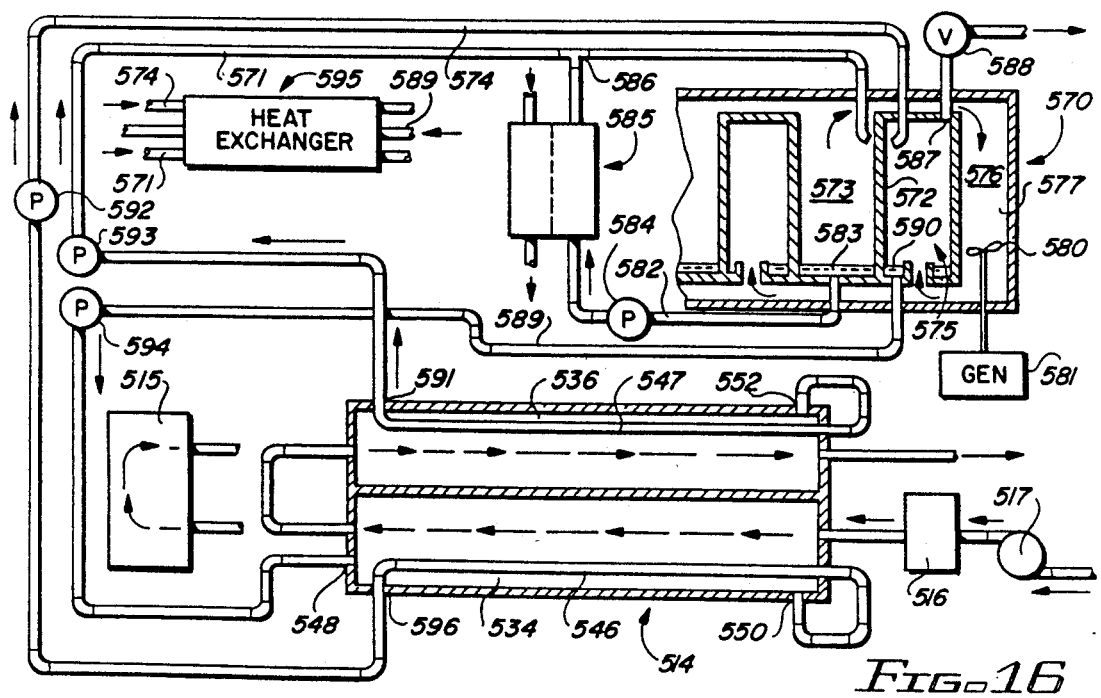
FIG. 16 is a schematic view of a device of the present invention coupled with a vapor pressure differential power generation device.

Referring now to FIGS. 14 through 16, the separation capabilities of the present invention coupled in nearly closed cycle with reverse electrodialysis, pressure retarded osmosis, and vapor pressure differential techniques are presented. The invention may be employed as a concentrator, fractionator, or stripper providing a wide choice of working solutions beyond brine and water mixtures normally considered and allows for control of their concentration levels. Examples of solution sets, each involving a less volatile concentrate and a more volatile condensate include brines/water, brines/alcohol and water, water/alcohol, water/ammonia, alcohols/ammonia, glycol/water or kerosine/gasoline. Solution operating temperatures can be set by heat exchange with liquids being processed by the present invention causing improved operating efficiency.

In FIG. 14 combination with an abridged Reverse Electro-Dialysis (RED) unit is presented. RED units utilize an electrolytic solution which in a nearly closed system is repeatedly diluted and reconcentrated. Concentrate 374 enters RED unit 375 and exits after passing through compartment 376 as diluted concentrate 377. Condensate stream 378 enters compartment 379 and exits as a mixed solution 380. The internal divisions for compartments 376 and 379 are alternately membranes 381 and 382. Membrane 381 is selectively permeable to anions while membrane 382 is selectively permeable to cations. In a multiple compartment unit membranes 381 and 382 are thought of as pairs and serve to hold various concentrations at varying potentials. The diffusion is from the concentrate of compartment 376 into any adjoining dilute compartment 379. The anions flow one compartment to the right through membrane 381 with the cations flowing likewise to the left through membrane 382. An additive voltage is produced across the membranes as the anions and cations permeate. The current produced, net of some process losses, is removed at electrodes 383 and 384.

Functional separation of the solutions by the invention is identical to that previously described. However, the device may also include assimilation of different concentrated solutions. Solution 380 may enter chamber 334 at port 348. The more concentrated solution 377 may expel to chamber 334 at 385 where its concentration equals that of the liquids therein. Optimum operating temperatures of liquids reaching RED unit 375 may be controlled from device 314 at any basin temperature. Concentrate from port 350 and condensate from port 352 may be heated by entering device 314 and heat exchanging through means 347 and 346 with discharge at ports 386 and 387 at the desired temperatures. From port 387 dilute 378 is circulated to RED unit 375 by pump 388 while concentrate 374 is flowed from port 386 to unit 37 via pump 389.

Further heat balance may be achieved as return dilute 380 may heat exchange with device liquids by entering at port 390 flowing through means 346 and exiting at port 391 with its temperature maximized prior to entry into chamber 33 via port 348. Spent concentrate 377 may enter chamber 334 at port 392 equal in temperature and heat exchanged by another means 347 until discharged at point 385.

Referring now to FIG. 15, combination with a pressure retarded osmosis (PRO) unit is shown. Power is obtained by permeation through a semi-permeable membrane of a solution into a pressurized solution thereby increasing its volume under pressure. Dilute solution 477, a condensate of device 414, after being heated by heat exchange with liquids of device 414 is moved by pump 478 to low pressure compartment 479 of PRO device 480. A liquid of greater solute concentration 482, a concentrate of device 414, after heat exchange with basin of device 414, is moved by pump 484 to high pressure compartment 485 of device 480. The two compartments are separated by semi-permeable membrane 486. Liquid permeates from compartment 479 into the higher concentration solute of compartment 485 at the higher hydraulic pressure. The resultant mixed solution 488 exiting from compartment 485 at increased volume and about the same pressure flows through unit 490 which may be a turbine, pump or turbogenerator. Effluent stream 491 is returned to device 414 at port 492 and is heat exchanged until released within chamber 434 at point 493 where the temperatures and concentrations of the entering and receiving liquids are nearly identical. A flushing stream 495 from compartment 479 is returned to chamber 434 at port 448.

High solution concentrations with large pressure differentials are possible by the present invention causing utilization within current membrane technology of a number of staged and limited differential PRO units. A stage above the system just described would utilized spent stream 491 as the dilute supplied to compartment 479 of a second PRO unit while a brine of 25 to 35% concentration would be supplied from device 414 to compartment 485 of a second PRO unit. The spent stream from this second unit could then be the concentrated brine supplied to chamber 485 of the unit first described.

Referring now to FIG. 16, a combination of the present invention with a power generation means utilizing vapor pressure differential is presented. Looking first at a schematic side view of power cell 570, a design utilizing vertical liquid flows, a limited series of compartments is shown. A more volatile solution of higher vapor pressure 571, a condensate of device 514, wets heat transmitting material 572 facing first compartment 573, or alternatively compartment 573 may be filled with solution 571. A less volatile solution of lower vapor pressure 574, a concentrate of device 514, enters power cell 570 and wets heat transmitting material 572 facing second compartment 575. Vapor 576 from the more volatile solution 571 flows through pathway 577 across power generation means 580 (which may be a turbine type machine connected to generator 581, a device involving antistatic or removal of surface static charges, or other means) to compartment 575 and then condenses on heat transmitting material 572. While energy released by this condensation is largely transmitted to compartment 573, this transmitting surface size is designed to cause the temperature of compartment 575 to be above that of compartment 573 allowing heat transfer recycle to compartment 573. Without this heat transfer, the evaporating solution will cool while warming the less volatile solution tending then to equalize the relative vapor pressures. Temperature stability within power cell 570 requires replenishment of energy equal to work done by power generation means 580. Heating of any fluid or vapor of cell 570 suffices where, for example, discharge stream 582 from basin 583 flows via pump 584 through heater 585, which may employ any relevant heating modes described for auxiliary heater 15, and joins solution 571 at intersect 586. The noncondensable gas within cell 570 must be minimized so that internal pressures are nearly equal to the vapor pressure of solutions 571 and 574. Such degassing may take place through port 587 with control device 588. Combining of solutions 571 and 574 to form a single vapor 576 provides a generally optimal method of operation when spent solution 589 collected from basin 590 is relatively similar to solution 574, a condition that generally implies solution 574 being in greater volume than solution 571. In cases where solution volumes 571 and 574 are more closely related so that a more rapid concentrational change in spent solution 589 relative to solutions 571 and 574 is evidenced, a greater power output may be obtained by staging the combining of these solutions. Such staging requires a multiple set of power cells 570 where spent solution 589 becomes either solution 571 or 574 of a subsequent cell.

Where the operating temperature of power cell 570 is approximately the same as the highest liquid temperature of device 514 all thermal energies required for device 514 may be efficiently supplied by heater 585. Spent solution 589 may then supply heat for device 514 entering at port 548 and then transferring its heat from chamber 534 to 536. The concentrate from port 550 and the condensate from port 552 may be increased in temperature by heat exchanging with liquids of device 514 utilizing heat exchanger means 546 and 547. Discharge at ports 590 and 591 would be at the highest available temperature. From port 590 solution 574 is circulated to power cell 570 by pump 592 while solution 571 is flowed from port 591 to power cell 570 via pump 593. Partial energy requirements for pumps 592 and 593 may be met by affixing power recovery pump 594 to spent solution 589. In cases where the operating temperature of power cell 570 is different from that of device 514, additional heat exchanger 595 may be employed to either increase or decrease these temperatures.

EXAMPLES

The present invention is more particularly described and explained by means of the following Examples. These are intended only to illustrate the invention and are not to be construed to limit the scope of the invention.

Experimental data reported herein was obtained from a device similar to the schematic of FIGS. 1 and 2, measuring 3 meters in length and 0.6 meters in height. The heat transferring partition was the woven polyethylene film previously described. Chamber width was variable from 3 mm to 13 mm (typically 3mm). Partition wetting was segmented into five sectors with wetting from basin liquids available to either or both partition sides (with partition side 56 normally wetted) and migratory movement provided by basins similar to basins 40 and 42. Auxiliary heat was generally by direct steam injection except for air cooling and liquid desiccant experiments. Primary gas temperature measurements were taken at locations delineated as "T1" (gas entrance), "T2" (end of chamber 34), "T3" (chamber 36 beyond heat exchanger 15), and "T4" (gas exit). Liquid basin temperatures and concentrations were measured within sectors identified by 63A–E and 71A–E. Applicable performance factors were developed by dividing energy supplied by the steam generator adjusted for known device heat losses.

Example I

In a desalination experiment, a weak brackish solution feed was furnished to the device at 100 milliliters per minute to obtain device performance. Air was supplied at a 0.06 cubic meters per minute rate (a gas velocity of 55 cm per second). Steam was set to provide a temperature of approximately 80° C. at T3. The results are as follows:

| Steam Usage | 0.23 kg per hour |
| --- | --- |
| T1 | 14° C. |
| T2 | 77° C. |
| T3 | 79° C. |
| T4 | 34° C. |
| Condensate rate | 33 ml per minute |

| | |
|---|---|
| Steam Usage | 0.23 kg per hour |
| Performance factor | 8 |

Example II

An experiment was conducted ascertain the wetting liquid temperature profile throughout chamber 34. Gas temperature was 73° C. at T3. The profile at steady operation is:

| | |
|---|---|
| 1. 63E-near heat exchanger 15 | 71° C. |
| 2. 63D | 62° C. |
| 3. 63C | 54° C. |
| 4. 63B | 44° C. |
| 5. 63A-near drain | 36° C. |

Example III

A liquid containing commercially available sea salt with a specific gravity of 1.025 was supplied to determine a developed concentration density profile when utilizing segmented wetting and migratory movement. The results obtained are:

| | Specific Gravity |
|---|---|
| 1. 63E-near auxiliary heater | 1.065 |
| 2. 63D | 1.074 |
| 3. 63C | 1.091 |
| 4. 63B | 1.096 |
| 5. 63A-near condensate drain | 1.099 |
| Drain | 1.105 |
| Condensate | 0.993 |

Example IV

A potassium carbonate solution feed with a specific gravity of 1.24 was furnished at 85 milliliters per minute to obtain air temperatures and liquid concentrations. Air was supplied at the rate of 0.034 cubic meters per minute. Steam provided a temperature of approximately 71° C. at T3. The results obtained are as follows:

| | |
|---|---|
| Steam Usage | 1.8 kg per hour |
| T1 | 42° C. |
| T2 | 72° C. |
| T3 | 73° C. |
| T4 | 49° C. |
| Condensate rate | 52 ml per minute |
| Condensate-specific gravity | 1.001. |
| Drain discharge rate | 32 ml per minute |
| Drain liquid-specific gravity | 1.51 (contained potash crystals) |

Example V

The device was adjusted for the fractionator function with both partition sides segmentedly wetted and chamber 34 and 36 basins combined adjacent to the heater. An inline blower and a supplemental cooler (a gas to liquid heat exchanger) were supplied. The gas (a combination of nitrogen and air) was supplied at a 0.34 cubic meters per minute rate. Feed was a 10 volume % ethanol and water mixture injected adjacent to the heater at 75 milliliters per minute. The results were as follows:

| | |
|---|---|
| Steam rate | 0.15 kg per hour |
| T1 | 27° C. |
| T2 | 44° C. |
| T3 | 46° C. |
| T4 | 28° C. |
| Concentrations (ethanol) | |
| 1. 63A | 2% |
| 2. 63C | 7% |
| 3. 63E-near heater | 9% |
| 4. 71E-near heater | 10% |
| 5. 71C | 12% |
| 6. 71A | 16% |
| Condensate at cooler (Partial condensation) | 41% |
| Energy requirements per liter of 41% ethanol | 93 kcal |

Example VI

The device was next modified as an air cooler with partition wetting changed to chamber 36. Chamber widths were adjusted to 6 mm. The air stream passing through chamber 34 was cooled by the same stream passing through chamber 36. For comparison, the device was adjusted to function as an evaporative cooler such that air moving through chamber 34 was subject to liquid contact by wetting of side 56 of chamber 34 with chamber 36 unutilized. The air stream was at 46 degrees C. and its relative humidity 27%. The results are tabulated below.

| | Temperature | Relative Humidity |
|---|---|---|
| Air Cooler | | |
| 1. 63A | 36° C. | |
| 2. 63C | 33° C. | |
| 3. 63E | 29° C. | 61% |
| 4. 71E | 25° C. | 88% |
| 5. 71C | 31° C. | |
| 6. 71A | 31° C. | 80% |
| Swamp Cooler | | |
| 1. 63A | 31° C. | |
| 2. 63C | 30° C. | |
| 3. 63E | 29° C. | 100% |

Both devices reduced the air stream to 29° C. at position 63e however the relative humidity was 61% for the air cooler versus saturation for the swamp cooler. At full saturation the air temperature of the air cooler would have been 22° C. at location 63e of some 7° C. cooler than that possible with the swamp cooler.

Example VII

A 50% solution of potassium carbonate and water was utilized as a liquid desiccant to lower adiabatically the relative humidity and increase the temperature of an air stream. Only chamber 34 was used and the partition was segmentedly wetted with the desiccant migrating counter-currently to the air stream. Air supplied was at 25° C. adjusted to near saturation. The air stream temperatures and humidity modification are presented below.

| | |
|---|---|
| 1. 63A-near air inlet | 25° C. |
| 2. 63C | 32° C. |
| 3. 63D | 33° C. |
| 4. 63E | 33° C. |

| Relative Humidity | 56% |
| --- | --- |

Example VIII

A device with a daily design capacity of 378,540 liters of water distillate utilizing solar thermal energy is developed assuming average arid ambient air temperature of 27° C. and average relative humidity of 30%. A sea water feed is assumed to concentrate 4 times. Alternately, a brackish water feed of 3,000 parts per million total dissolved solids would be reduced 50 times. Using 82° C. as maximum device temperature and an eight hour solar day, a transfer area of 38,461 square meters would be required. Inexpensive plastic film would be segregated into 1,725 6.25 millimeter wide channels dimensioned 1.83 meters high by 12.2 meters long. The device thermal performance factor is slightly over 40. The flat plate collector field would approximate 1,700 square meters based on an hourly solar incidence of 67.8 calories per square centimeter and 54% energy conversion. Air movement totals 868 cubic meters per minute with a static pressure of 12.7 millimeters water column. Computed power requirements are 1.76 kilowatts (kw) and with fans operating at a 48% efficiency requires 3.7 kw. Segregated modulated pumping requirements for wetting partitions in alternate chambers at 60% efficiency causes power consumption of 2.0 kw. Total electrical usage equals 0.12 kwh per cubic meter of distillate. In comparison, a recent study found reverse osmosis procedures have an electrical usage of 2.09 kwh per cubic meter.

Utilizing direct injected natural gas for heat, 24 hour operation would allow device size reduction of two-thirds. Daily parasitic power requirements (46 kwh) would stay equal while gas usage would be 1.44 cubic meters per cubic meter of distillate. Thermal requirements are then 12,800 kilo calories per cubic meter of distillate. A recent comparative study found vertical tube evaporation and multistage flash processes with respective requirements of 47,100 and 55,500 kilo calories per cubic meter of distillate. This study also developed capital cost for brackish water distillation plants. The present invention may cost about one-fifth of a VTE plant and under one-third of a reverse osmosis plant with evaporation ponds.

Example IX

Requirements for distillation of 4,536 kilograms per hour of 10 weight % ethanol and water into 594 liters of a 95 weight % distillate stream and a water stream are developed. The fractionator would contain 344 square meters of transfer area divided into 120 chambers 4.66 meters long by 0.61 meters high. The air supply would be 17 cubic meters per minute of 27° C. 30% relative humidity air that would first be cooled to 16° C. by adiabatic humidification. This air stream would reach 82° at the auxiliary heater with an energy requirement of 25,200 kilo calories per hour. This air stream would then cool to 21° C. for atmospheric discharge. Computed electrical usage for air movement and liquid pumping is 0.35 kw and adjusted to 1.23 kw to reflect mechanical and electrical inefficiencies. The device would consume 9.8 liters per hour of water by evaporation into the exhaust air. Thermal energy requirements could be met by 69 square meters of solar collector of Example VIII, or by 0.036 cubic meters per minute of natural gas direct heat injection. Energy needed per gallon of 95% ethanol distillate would be 44.2 kilo calories per liter or 664 Btu's per gallon.

Example X

A device capable of meeting dwelling comfort zone requirements of 24° C. and under 65% relative humidity for summer and 20° C. during the winter is developed. Climatic conditions selected include an arid area (Phoenix, Ariz.) with a summer design specification of 42° C. dry bulb and 22° C. wet bulb and a January minimum normal temperature average of nearly 4° C. dry bulb. A second area for cooling evaluation is hot and continually very humid Houston, Tex. with design parameters of 35° C. dry bulb and 25° C. wet bulb. Summer load requirements are specified at 3 tons (36,000 Btu's or 9,072 kilo calories) with a latent heat factor equal to 30% of the total load. The device would contain 37 to 93 square meters of transfer partition depending upon channel configuration. Air movement would be 62 cubic meters per minute. System pressure (7.9 millimeters for the device plus external spray adiabatic activities and air duct resistances) is 1.3 cm water gage. Maximum system computed air movement requirements are 0.13 kw. or 0.325 kw at a 40% blower efficiency. Utilizing spray nozzles, pulsed chamber wetting requires 53 liters per minute at and at 20% efficiency (hydrodynamic modulating system) electrical power including adiabatic wettings would be 0.125 kw. Maximum power use is 0.325 kw (279 kilocalories per hour). Function at various climatic parameters is projected below.

Example XA

During arid area cooling operation, ambient air entering the first chamber is cooled by heat transfer through the partition to 18° C. and further adiabatically cooled to 14° C. for dwelling injection. Upon returning the 24° C., 55% relative humidity air is adiabatically cooled to 17° C. and subjected to partition segmented wetting and exits at 24° C. saturated. Water usage is 20 liters per hour. As the system has excess capacity, the fraction of time in use (operating factor) is 54% resulting in utilization of 0.24 kw or 209 kilo calories per hour or electrical coefficient of performance (COP) of 43. In comparison, a standard heat pump producing the same cooling energy generally has a COP of 2.0 to 2.5.

The effect of nonsegmentation of partition wetting has been simulated using the above design criteria and device. Air temperature to the dwelling would be 18° C. versus 14° C. and the dwelling would establish a 70% relative humidity compared with 55%. Cooling capacity would be 61% of the segmented wetting approach.

To meet the same dwelling design temperature of 24° C. an evaporative "swamp" cooler would utilize 142 cubic meters of air per minute. Water consumption would be 81 liters of water per hour, however, relative humidity in the dwelling would reach 89%, a condition far outside accepted comfort zone standards.

Example XB

In cooling the humid area, ambient air entering the first chamber is cooled by thermal transfer through the partition to 24° C. and 85% relative humidity. In its relative humidity would then be reduced to 50% using a liquid desiccant such as a 50 weight % solution of potassium carbonate at the rate of 16 kilograms per hour. Water removed totals 37 kilograms per hour causing a dilution in the desiccant to 15 weight %. The 24° C. and 50% relative humidity air is then adiabatically cooled by the spent desiccant stream to 19° C. and 85% relative humidity evaporating 9.5 kilograms of water per hour. The air is dwelling circulated and returned at 24° C. and 64% relative humidity. The air is adiabatically cooled to 19° C. and continuously wetted in the second chamber exiting saturated at 26° C. Water usage totals 45 liters per hour and a net 44 kilograms per hour of 18% desiccant solution would require reconcentration. System electrical usage would be 0.45 kw (388 kilo calories per hour) resulting in an electrical COP of 23.

Example XC

During arid area winter conditions, heated air may be supplied where 4° C. ambient air is brought into the first chamber with its partition segmentedly wetted with water. Absorbing heat through the partition, the air stream heats to 15° C. developing a nearly saturated condition. A temperature increase to 22° C. is then affected by dehumidifying the air to 50% relative humidify by exposure to a 50 weight % solution of potassium carbonate removing 15 liters of water per hour. The heated air enters the dwelling and returns to the other chamber at 20° C. and 58% relative humidity and is increased in humidity by adiabatic cooling. This chamber is segmentedly wetted with the desiccant entering at full strength at the chamber exit and slowly flowing counter-currently to the air stream. Owing to heat transfer through the partition, the air stream cools and exits at 7° C. and 50% relative humidity having lost water vapor (30 liters per hour) throughout its path. Desiccant usage totals 23 liters per hour and is diluted to 10% in the first dehumidification and to 30% in the second chamber. The electrical COP in this function would be 5.9. By comparison, a standard heat pump operating in a heating mode at these design parameters has a COP of slightly over 2.5.

Example XI

Methods for concentrated salt regeneration are developed for high humidity areas (Houston, Tex.). The potassium carbonate solution of Example XB would be concentrated from 18% to a 50% in the parallel cascade device arrangement. Ambient air in the first device would be heated from 35 to 82° C. in the evaporating chamber and cool to 38° C. in the concentration chamber. A portion of the air stream, some 24% which is in excess of energy balance requirements of the first device, would be diverted to a second device before entering the condensing chamber with this cascade effect repeated throughout the device stack. Nine devices with partition area of 26 square meters are utilized ranging in size from 8.2 to 0.6 square meters. The air rate is 1.5 cubic meters per minute with the first device receiving 0.36 and the ninth 0.10 cubic meters. Thermal energy requirements would total 1,850 kilocalories per hour giving a performance factor of 7.2.

As an alternative method of desiccant regeneration, a compressor may be used with a single device. Assuming the same ambient conditions and temperature rise in the evaporation chamber, the air stream would be compressed to 20 kPa with its temperature increased to 105° C. Following saturation, the air stream would enter the condensation chamber at 85° C. and exit and be pressure relieved at 54° C. Regenerating the same flow of desiccant, the device would require 13.3 square meters of transfer surface with air movement of 1.5 cubic meters per minute. Thermal requirements total 660 kilocalories or an electrical power consumption (at 50% efficiency) of 1.52 kw providing an effective performance factor of 10.

In a third method of desiccant regeneration, a device using only evaporation chambers can be employed. A suitability sized device, for example, with air movement of 142 cubic meters per minute counter-current to the liquid migratory flow would provide the same water removal rate of 23.5 liters per hour.

Example XII

A small scale electrical plant is developed with a vapor pressure differential power cell combined with the ethanol and water products from Example IX. The fractionator hourly streams of 594 liters of 95% ethanol and 4,060 kilograms of water at 18° C. would first be rerouted through the device absorbing the feed stock energy. These heated streams would be pumped to opposite sides of a 15 square meter power cell heat exchanger. The ethanol stream would be controlled to 79° C. in the 106 kPa evaporation compartment while the water side of the cell would be maintained at 82° C. Evaporating ethanol vapors would pass through a turbine or low pressure blower utilizing 6 PSI pressure drop producing 4.4 kw of electrical energy (omitting turbine losses). These vapors would then condense in the water compartment at 65 kPa giving up the energies of condensation which conduct through the heat exchanger wall to the cooler evaporation compartment. The 10% ethanol solution formed in the 82° C. condensation compartment would be returned t the fractionator as the hot feed stock thus completing the cycle. Operation and temperature ranges of the fractionator as well as its size (344 square meters) and air traffic (17 cubic meters per minute) would be the same as previously described. The heat exchange area for reheating the product streams would total 139 square meters generally of inexpensive plastic film material or stainless steel foil.

What is claimed is:

1. An apparatus for air conditioning, said apparatus comprising:
    a first chamber divided into a plurality of first chamber sectors;
    a second chamber divided into a plurality of second chamber sectors,
    said first and second chambers further being thermally connected by a partition, wherein said partition is implemented to conduct heat;
    means for causing air to be conditioned to flow through a one of said chambers, and, after exchanging heat, through another of said chambers, air flow in said first and second chambers being thermally countercurrent;
    wetting means in said first chamber for segmentally wetting at least a plurality of said first chamber sectors with a desiccant solution, wherein an interaction by said desiccant solution with said air progressively dehumidifies said air;
    migration means for providing a migratory movement for said desiccant solution from a first sector to a second sector within said first chamber; and
    means for segmentally wetting said plurality of sectors of said second chamber with a vaporizable liquid,
    said partition conducting heat between said air in said first and second chambers.

2. The apparatus for air conditioning of claim 1 further comprising means for providing a second migratory movement in said second chamber, said vaporizable liquid and said second migratory movement being coupled, wherein migratory movement is different between said second chamber sectors.

3. The apparatus of claim 1 wherein said first chamber is provided with an air inlet so that said air flow is from said first chamber to said second chamber to provide for cooling of air in said first chamber.

4. The apparatus of claim 3 further comprising: a humidifying evaporator connected to receive air from said first chamber and lower a temperature thereof by evaporation of a vaporizable liquid therein prior to an exchange of heat preceding flow of air through said second chamber; and
means for regenerating said desiccant solution.

5. The apparatus of claim 1 wherein said second chamber is provided with an air inlet and air is flowed from said second chamber to said first chamber, wherein said air is heated in said second chamber.

6. The apparatus of claim 5 further comprising means connected to receive air from said second chamber and raise a temperature thereof by condensation of a vapor into said desiccant solution therein prior to exchanging heat and preceding flow of air through said first chamber, and means for regenerating said desiccant solution.

7. The apparatus of claim 1 further comprising means for regenerating said desiccant solution.

8. The apparatus of claim 1 wherein said one chamber is said first chamber, said apparatus further comprising a humidifying evaporator connected to receive air from said first chamber and lower a temperature thereof by evaporation of a vaporizable liquid therein prior to said exchange of heat and subsequent flow of said air through said second chamber.

9. The apparatus of claim 1 further comprising means for connecting said chambers to a space to be conditioned so that air flow between said chambers mixes with air in said space to be conditioned.

10. The apparatus of claim 1 further comprising means for providing fluid for heat exchange connected to said causing means.

11. The apparatus of claim 1 wherein said first chamber is provided with an air inlet so that said air flow is from said first chamber to said second chamber to provide for cooling of air in said first chamber by transfer of heat through said partition from said first chamber to said second chamber, said apparatus further comprising adiabatic means connected to receive air from said first chamber and lower a temperature thereof by evaporation of a vaporizable liquid prior to said exchanging.

12. The apparatus of claim 1 wherein said second chamber is provided with an air inlet and said air is flowed from said second chamber to said first chamber so that said air is heated in said second chamber by a transfer of heat through said partition from said first chamber to said second chamber, said apparatus further comprising adiabatic means connected to receive air from said second chamber and raise a temperature thereof by condensation of vapor from said air into said desiccant solution prior to said transfer of heat.

13. An apparatus according to claim 11 further comprising a second adiabatic means for changing said temperature and humidity of said air flowing between said chambers, said second adiabatic means connected to receive air from said causing means.

14. An apparatus for air conditioning a space, said apparatus comprising:
a first chamber;
wetting means for segmentally wetting at least part of said first chamber with a desiccant solution;
a second chamber thermally connected to said first chamber by a heat conducting partition;
means for regulating a flow of air causing said air to flow through said first chamber, and after conditioning said space, through said second chamber, said air flow in said chambers being thermally countercurrent;
means for lowering the temperature of said air leaving said first chamber;
migration means coupled to said wetting means for providing a migratory movement of said desiccant solution between sectors in said first chamber; and
means for segmented wetting of at least part of a second chamber with water to progressively humidify said air, wherein said partition transfers heat between said air in said first chamber and air in said second chamber.

15. The apparatus for air conditioning of claim 14 further comprising migration means coupled to said wetting means for said second chamber for providing a migratory movement between sectors in said second chamber.

16. The apparatus for air conditioning of claim 14 further including means for regenerating said desiccant solution.

17. An apparatus for air conditioning, said apparatus comprising:
first and second chambers each having a plurality of segments, said chambers being separated by a heat conductive partition to effectuate a transfer of heat from said first chamber to said second chamber;
said first chamber including a passageway for incoming, ambient air and said second chamber including a passageway for outgoing air flowing countercurrent to the ambient air;
means for placing a desiccant solution in a wetting relation to the segments of said first chamber and in contact with said incoming, ambient air to dry said desiccant solution while said desiccant solution is being initially cooled by heat transfer through said partition;
means for flowing said desiccant solution from a segment of greater concentration to a segment of lesser concentration and in countercurrent relation to said incoming air;
a first humidifying evaporator for receiving and further cooling and for increasing a relative humidity of dry, initially cooled air exiting said first chamber, said further cooled air being adapted to pass to said space to be conditioned;
a second humidifying evaporator for receiving warmed air from said space to be conditioned and for cooling and increasing the relative humidity of warmed air exiting said space after conditioning;
means defining an air flow path between said second humidifier and said second chamber; and
means for wetting said segments of said second chamber with water so that outgoing air will evaporate the water to further cool said outgoing air moving through said second chamber and thereby cool said partition.

18. The apparatus for air conditioning of claim 17 further comprising means for regenerating said desiccant solution.

19. An apparatus for heating, said apparatus comprising:
   a first chamber divided into a plurality of first chamber sectors;
   a second chamber divided into a plurality of second chamber sectors;
   said first and second chambers further being thermally connected by a partition, where said partition is implemented to conduct heat;
   means for causing air to flow through said first chamber, and, after exchanging heat through said partition, through said second chamber, air flow in said first and second chambers being thermally countercurrent;
   wetting means in said second chamber for segmentally wetting at least a plurality of said second chamber sectors with a desiccant solution, wherein an interaction by said desiccant solution with said air progressively dehumidifies said air;
   migration means for providing a migratory movement for said desiccant solution from a first sector to a second sector within said second chamber; and
   means for segmentally wetting at least some of said plurality of sectors of said first chamber with a vaporizable liquid;
   said partition conducting heat between said air in said first and second chambers such that air in said second chamber is cooled while air in said first chamber is heated.

20. The apparatus for heating according to claim 19 further comprising means between said first and second chambers for adiabatically increasing said temperature of air flowing from said first chamber.

21. A method of conditioning air, said method comprising the steps of:
   flowing air in a first stream, and then, after changing a heat content of said air, in a second stream thermally countercurrent and in heat exchange relation with said first stream;
   segmentally wetting one of said streams in at least a plurality of sectors with a desiccant solution so as to progressively dehumidify air in said one stream;
   moving said desiccant solution from one of said plurality of sectors of said one stream to at least one other sector of said one stream; and
   segmentally wetting at least some of a plurality of sectors of the other of said streams with a vaporizable liquid.

22. The method of claim 21 further comprising a step of moving said vaporizable liquid from one of said sectors of said second stream to at least one other sector of said second stream.

23. The method of claim 21 wherein said step of segmentally wetting with a desiccant solution is performed on said first stream of air and said change in heat content of said air is a decrease in said heat content to provide a cooling period.

24. The method of claim 21 wherein said step of segmentally wetting with a vaporizable liquid is performed on said first stream and said change in heat content of the air is an increase to thereby provide heating.

25. The method of claim 21 further comprising a step of regenerating said desiccant solution.

26. The method of claim 21 further comprising a step of evaporating a vaporizable liquid in said air prior to said changing of heat content and after said flowing air in said first stream.

27. The method of claim 21 further comprising:
   a step of evaporating a vaporizable liquid in said air prior to said changing of heat content and after said flowing air in said first stream; and
   a step of regenerating said desiccant solution.

28. A method of air conditioning, said method comprising the steps of:
   segmentally wetting sectors of a first chamber with a desiccant solution;
   providing a migratory movement of said desiccant solution between said sectors;
   providing incoming air to be conditioned for interaction with said desiccant solution, said air being flowed countercurrent to said migratory movement and being progressively dehumidified by interaction with said desiccant solution within said sectors;
   causing air to move through a second chamber having sectors;
   causing said first and said second chambers to be thermally connected by a heat conducting partition;
   providing for a temperature of said air in said second chamber to be lower than a temperature in said first chamber, wherein a heat required for said temperature change is less than a total sensible and latent energies exchanged between said air and wetting substances in any chamber; and
   providing segmented wetting with water to progressively humidify said air in said sectors of said second chamber.

29. The method of air conditioning of claim 28 further comprising a step of providing a migratory movement of said water between said sectors of said second chamber.

30. A method of conditioning air, said method comprising the steps of:
   moving ambient air in a first stream in heat exchange relation with a countercurrently flowing second stream of outgoing air;
   introducing a desiccant solution in segments of said first stream and in countercurrent relation with respect to said incoming, ambient air to dry said incoming, ambient air while removing a heat of condensation of water in said first stream as well as some of a sensible heat of said first stream by heat transfer to said second stream;
   lowering a temperature and increasing a relative humidity of said first stream by adiabatic evaporation thereby providing a third stream of cooled conditioning air at a desired relative humidity;
   passing said third stream to a space to be conditioned;
   lowering a temperature and increasing a relative humidity of said third stream after it exits said space by further adiabathic evaporation to provide said second stream of cooled air at a high relative humidity; and
   wetting segments of said second stream with water and evaporate said water with heat from said first stream to maximize said heat transfer from said first stream.

* * * * *

UNITED STATES PATENT AND TRADEMARK OFFICE
CERTIFICATE OF CORRECTION

PATENT NO. : 5,020,335

DATED : June 4, 1991

INVENTOR(S) : Walter F. Albers

It is certified that error appears in the above-indentified patent and that said Letters Patent is hereby corrected as shown below:

```
On the title page item [63], delete --"abandoned", and insert
--Pat. No. 4,832,115--.
```

Signed and Sealed this

Fifth Day of November, 1996

Attest:

BRUCE LEHMAN

Attesting Officer    Commissioner of Patents and Trademarks